United States Patent
Hirota et al.

(10) Patent No.: US 8,404,036 B2
(45) Date of Patent: Mar. 26, 2013

(54) WATER-SOLUBLE NEAR-INFRARED ABSORBING COLORING MATTERS AND AQUEOUS INKS CONTAINING SAME

(75) Inventors: Koji Hirota, Tokyo (JP); Takafumi Fujii, Tokyo (JP); Tatsuto Yui, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 261 days.

(21) Appl. No.: 13/055,696

(22) PCT Filed: Jul. 24, 2009

(86) PCT No.: PCT/JP2009/063253
§ 371 (c)(1),
(2), (4) Date: Jan. 24, 2011

(87) PCT Pub. No.: WO2010/013648
PCT Pub. Date: Feb. 4, 2010

(65) Prior Publication Data
US 2011/0123784 A1    May 26, 2011

(30) Foreign Application Priority Data

Jul. 28, 2008 (JP) ................. 2008-193303
Mar. 17, 2009 (JP) ................. 2009-063950
Apr. 27, 2009 (JP) ................. 2009-108357

(51) Int. Cl.
*C09D 11/02* (2006.01)
*C09B 47/00* (2006.01)

(52) U.S. Cl. .................... 106/31.47; 540/126

(58) Field of Classification Search ........... 106/31.47, 106/31.49; 540/126, 133, 134; 347/100; 428/195.1
See application file for complete search history.

(56) References Cited

U.S. PATENT DOCUMENTS

| | | | | |
|---|---|---|---|---|
| 4,418,015 | A * | 11/1983 | Schreiner et al. ............ | 540/126 |
| 4,952,688 | A * | 8/1990 | Springer ...................... | 540/134 |
| 5,322,760 | A * | 6/1994 | Itoh et al. ..................... | 540/126 |
| 5,453,501 | A * | 9/1995 | Jager ............................ | 540/126 |
| 6,444,807 | B1 * | 9/2002 | Wolleb et al. ................ | 540/133 |
| 7,122,076 | B2 | 10/2006 | Vonwiller et al. | |
| 7,419,537 | B2 * | 9/2008 | Fujii et al. ................... | 106/31.47 |
| 7,585,361 | B2 * | 9/2009 | Yoneda et al. .............. | 106/31.47 |
| 7,591,888 | B2 * | 9/2009 | Fujii et al. ................... | 106/31.47 |
| 7,750,147 | B2 * | 7/2010 | Vonwiller et al. .......... | 106/31.49 |
| 7,837,775 | B2 * | 11/2010 | Vonwiller et al. .......... | 106/31.49 |
| 7,854,797 | B2 * | 12/2010 | Fujii et al. ................... | 106/31.47 |
| 7,901,497 | B2 * | 3/2011 | Kurata et al. ............... | 106/31.49 |

FOREIGN PATENT DOCUMENTS

| | | |
|---|---|---|
| JP | H01-297293 | 11/1989 |
| JP | H02-167791 | 6/1990 |
| JP | H03-113849 | 5/1991 |
| JP | H04-73188 | 3/1992 |
| JP | 2507786 | 6/1996 |
| JP | 2007/277416 | * 10/2007 |
| JP | 2008/013706 | * 1/2008 |
| WO | WO 2009/060573 | 5/2009 |

OTHER PUBLICATIONS

Abstract of JP 2007/277416; Oct. 2007.*
Abstract of JP 2008/013706; Jan. 2008.*
International Search Report issued in corresponding PCT Application No. PCT/JP2009/063253, mailed Oct. 13, 2009.

* cited by examiner

*Primary Examiner* — Helene Klemanski
(74) *Attorney, Agent, or Firm* — Knobbe Martens Olson & Bear LLP

(57) ABSTRACT

Coloring matters represented by general formula (1) or salts thereof are simply provided at a low cost as water-soluble coloring matters which exhibit absorption in the near-infrared region. Further, aqueous ink compositions which contain the coloring matters and have excellent storage stability are also provided. In general formula (1), Nc is optionally substituted naphthalocyanine; M is a metal oxide or the like; $R^1$ and $R^2$ are each independently hydrogen or the like; A is a crosslinking group; X and Y are each independently substituted arylamino or the like; k is more than 0 but up to 12 (on average); p is 0 to less than 12; the sum of k and p is more than 0 but up to 12; and any two or the three of $R^1$, $R^2$ and A may be united to form a ring.

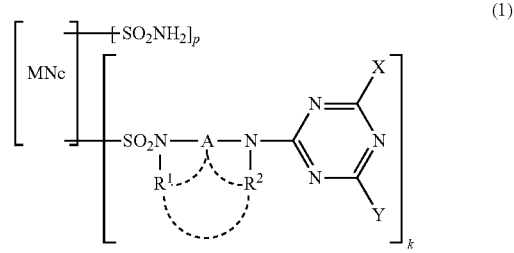

(1)

15 Claims, No Drawings

WATER-SOLUBLE NEAR-INFRARED ABSORBING COLORING MATTERS AND AQUEOUS INKS CONTAINING SAME

This application is the U.S. National Phase under 35 U.S.C. §371 of International Application PCT/JP2009/063253, filed Jul. 24, 2009, designating the U.S., and published in Japanese as WO 2010/013648 on Feb. 4, 2010, which claims priority to Japanese Patent Application No. 2008-193303, filed Jul. 28, 2008; Japanese Patent Application No. 2009-063950, filed Mar. 17, 2009; and Japanese Patent Application No. 2009-108357, filed Apr. 27, 2009. The entire contents of all of these priority applications are incorporated herein by reference.

TECHNICAL FIELD

The present invention relates to a water soluble coloring matter that exhibits absorption in a near-infrared region, or a salt thereof, and an aqueous ink composition containing the same.

BACKGROUND ART

Near-infrared absorbing coloring matters that exhibit absorption in a near-infrared region of 700 to 2,000 nm have been conventionally studied for use in a variety of industrial applications. For example, they have been used for: optical information recording media such as CD-R; thermal CTP; flash toner fixation; printing such as laser thermal recording, etc.; and the like, as well as heat shielding film, etc. Furthermore, characteristic features of selectively absorbing light in a specific wavelength region are utilized to apply for near-infrared cut filter used in PDP filters, etc., as well as films for plant growth regulation, and the like. In addition, by dissolving or dispersing a near-infrared absorbing coloring matter in a solvent to prepare an ink, the coloring matter can be used also as a near-infrared absorbing ink which is unrecognizable by visual observation but is readable only with a near-infrared radiation detector, etc.

Inks such as near-infrared absorbing inks are generally classified into aqueous type and organic solvent-base type in accordance with principal components of the solvent; however, in light of environmental issue and the like, aqueous inks have been strongly demanded, and thus development of a near-infrared absorbing coloring matter soluble in water has been desired.

Known near-infrared absorbing coloring matters include immonium coloring matters, diimmonium coloring matters, dithiol metal complex coloring matters, cyanine coloring matters, and the like, and in particular, naphthalocyanine coloring matters have been known as a highly durable near-infrared absorbing coloring matter.

Most well-known naphthalocyanine coloring matters are pigments insoluble in solvents, or coloring matters that are soluble only in organic solvents (for example, see Patent Document 1), and naphthalocyanine coloring matters that exhibit favorable solubility in water are scarcely known.

In Examples of Patent Documents 2 and 3, a water soluble naphthalocyanine coloring matter is obtained by sulfonating a naphthalocyanine coloring matter. Although this compound is soluble in water, storage stability is inferior when provided as an aqueous ink composition, thereby leading to unsatisfactory practical applicability.

Patent Document 1: Japanese Patent No. 2507786
Patent Document 2: Japanese Unexamined Patent Application, Publication No. H2-167791
Patent Document 3: U.S. Pat. No. 7,122,076

DISCLOSURE OF THE INVENTION

Problems to be Solved by the Invention

The present invention was made in view of the foregoing circumstances, and an object of the present invention is to provide a water soluble coloring matter that is conveniently available at low cost, and exhibits absorption in a near-infrared region. Furthermore, another object of the present invention is to provide an aqueous ink composition containing the water soluble coloring matter, and having superior storage stability, with industrial utility value improved.

Means for Solving the Problems

The present inventors thoroughly investigated in order to solve the foregoing problems, and consequently found that a water-soluble and near-infrared absorbing coloring matter represented by a certain formula, and an aqueous ink composition containing the same solve the aforementioned problem. Thus, the present invention was completed.

Accordingly, the present invention relates to the following.

A first aspect of the present invention provides a coloring matter represented by the following formula (1) or a salt thereof,

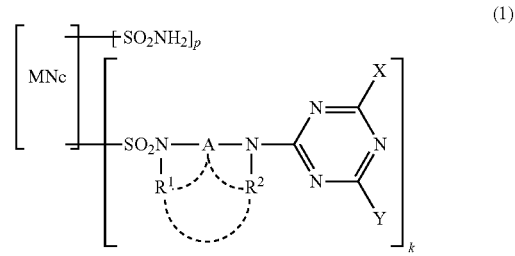

in the formula (1),

Nc represents naphthalocyanine which may have a substituent;

M represents a metal atom, a metal oxide, a metal hydroxide or a metal halide that serves as a central metal of naphthalocyanine represented by Nc, or a hydrogen atom;

$R^1$ and $R^2$ each independently represent a hydrogen atom, a substituted or unsubstituted alkyl group, a substituted or unsubstituted aralkyl group, or a substituted or unsubstituted aryl group;

A represents a crosslinking group;

X and Y each independently represent a halogen atom, a hydroxy group, an amino group, a substituted or unsubstituted alkoxy group, a substituted or unsubstituted aryloxy group, a substituted or unsubstituted aralkyloxy group, a substituted or unsubstituted monoalkylamino group, a substituted or unsubstituted dialkylamino group, a substituted or unsubstituted arylamino group, a substituted or unsubstituted aralkylamino group, a substituted or unsubstituted alkylthio group, a substituted or unsubstituted arylthio group, or a substituted or unsubstituted aralkylthio group;

both k and p are a mean value, k is greater than 0 and no greater than 12, p is no less than 0 and less than 12, and the sum of k and p is greater than 0 and no greater than 12; and
any two among $R^1$, $R^2$, and A may be joined to form a ring.

A second aspect of the present invention provides the coloring matter or a salt thereof according to the first aspect, in which the coloring matter represented by the above formula (1) or a salt thereof is a coloring matter represented by the following formula (2) or a salt thereof,

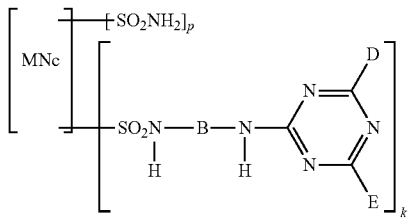

in the formula (2),

Nc, M, k, and p are as defined in connection with the above formula (1);

B represents an alkylene group, a phenylene group, or a xylylene group; and

D and E each independently represent a chlorine atom; a hydroxy group; an amino group; an alkoxy group unsubstituted, or substituted with a hydroxy group, a sulfo group or a carboxy group; a phenoxy group unsubstituted, or having a benzene ring substituted with one or at least two substituents selected from the group consisting of a chlorine atom, an alkyl group, an alkoxy group, a sulfo group and a carboxy group; a naphthoxy group unsubstituted, or having a naphthalene ring substituted with one or two substituents selected from the group consisting of an acetylamino group and a sulfo group; a benzyloxy group unsubstituted, or having a benzene ring substituted with a sulfo group; a phenethyloxy group unsubstituted, or having a benzene ring substituted with a sulfo group; a mono- or di-alkylamino group unsubstituted, or substituted with a hydroxy group, an unsubstituted C1-C4 alkoxy group, a sulfo group or a carboxy group; a phenylamino group unsubstituted, or having a benzene ring substituted with one or at least two substituents selected from the group consisting of a chlorine atom, an unsubstituted C1-C4 alkyl group, an unsubstituted C1-C4 alkoxy group, a sulfo group and a carboxy group; a naphthylamino group unsubstituted, or having a naphthalene ring substituted with a sulfo group; a benzylamino group unsubstituted, or having a benzene ring substituted with a sulfo group; a phenethylamino group unsubstituted, or having a benzene ring substituted with a sulfo group; an alkylthio group unsubstituted, or substituted with a hydroxy group, a sulfo group or a carboxy group; a phenylthio group unsubstituted, or having a benzene ring substituted with one or at least two substituents selected from the group consisting of an unsubstituted C1-C4 alkyl group, an unsubstituted C1-C4 alkoxy group, a sulfo group and a carboxy group; or a naphthylthio group unsubstituted, or having a naphthalene ring substituted with a sulfo group.

A third aspect of the present invention provides the coloring matter or a salt thereof according to the second aspect, in which: B represents a C2-C6 alkylene group; and D and E each independently represent a chlorine atom; a hydroxy group; an amino group; a mono- or di-C1-C4 alkylamino group unsubstituted or substituted with a hydroxy group, an unsubstituted C1-C4 alkoxy group, a sulfo group or a carboxy group; a phenylamino group unsubstituted, or having a benzene ring substituted with one or at least two substituents selected from the group consisting of an unsubstituted C1-C4 alkyl group, an unsubstituted C1-C4 alkoxy group, a sulfo group and a carboxy group; a naphthylamino group unsubstituted, or having a naphthalene ring substituted with a sulfo group; a benzylamino group unsubstituted, or having a benzene ring substituted with a sulfo group; or a phenethylamino group unsubstituted, or having a benzene ring substituted with a sulfo group.

A fourth aspect of the present invention provides the coloring matter or a salt thereof according to any one of the first to third aspects, in which M represents a metal atom, a metal oxide, a metal hydroxide, or a metal halide selected from the group consisting of Fe, Co, Cu, Ni, Zn, Al, AlOH, AlCl, V, and VO.

A fifth aspect of the present invention provides the coloring matter or a salt thereof according to any one of the second to fourth aspects, in which Nc represents naphthalocyanine not having a substituent other than substituted sulfamoyl groups the number of substitution therewith is represented by k, and unsubstituted sulfamoyl groups the number of substitution therewith is represented by p;

both k and p are a mean value; k is no less than 0.1 and no greater than 4, and the sum of k and p is no less than 0.1 and no greater than 12;

M represents Cu or VO;

B represents an ethylene group or a propylene group; and

D and E each independently represent a hydroxy group, an amino group, a phenylamino group unsubstituted, or substituted with at least one carboxy group or a sulfo group, or a mono C2-C4 alkylamino group unsubstituted, or substituted with at least one carboxy group or a sulfo group.

A sixth aspect of the present invention provides the coloring matter or a salt thereof according to any one of the first to fifth aspects, which is obtained by allowing a compound represented by the following formula (101), and a compound represented by the following formula (7) to react in the presence of a source of ammonia,

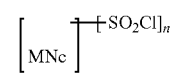

in the formula (101), Nc and M are as defined in connection with the formula (1), and n is a mean value, which is greater than 0 and no greater than 12,

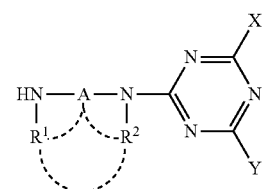

in the formula (7), $R^1$, $R^2$, A, X, and Y are as defined in connection with the formula (1).

A seventh aspect of the present invention provides an aqueous ink composition containing at least one coloring matter or a salt thereof according to any one of the first to sixth aspects.

An eighth aspect of the present invention provides the aqueous ink composition according to the seventh aspect further containing an aqueous organic solvent.

A ninth aspect of the present invention provides the aqueous ink composition according to the seventh or eighth aspect for use in ink jet recording.

A tenth aspect of the present invention provides an ink jet recording method including discharging ink droplets of the aqueous ink composition according to any one of the seventh to ninth aspects in response to recording signals to execute recording by allowing the ink droplets of the ink composition to adhere on a record-receiving material.

An eleventh aspect of the present invention provides the ink jet recording method according to the tenth aspect, in which the record-receiving materials is a communication sheet.

A twelfth aspect of the present invention provides the ink jet recording method according to the eleventh aspect, in which the communication sheet is a sheet having an ink receiving layer containing a porous white inorganic substance.

A thirteenth aspect of the present invention provides an ink jet printer equipped with a vessel containing the aqueous ink composition according to any one of the seventh to ninth aspects.

A fourteenth aspect of the present invention provides a recorded matter recorded with the aqueous ink composition according to any one of the seventh to ninth aspects.

A fifteenth aspect of the present invention provides the recorded matter according to the fourteenth aspect, in which recording was carried out using an ink jet printer.

Effects of the Invention

The water-soluble and near-infrared absorbing coloring matter represented by the above formula (1) or a salt thereof of the present invention is superior in solubility in water or a water soluble organic solvent. In addition, the aqueous ink composition of the present invention containing this compound exhibits extremely favorable storage stability, without being accompanied by crystal precipitation, physical property alteration, change in the hue and the like after storage for a long period of time.

PREFERRED MODE FOR CARRYING OUT THE INVENTION

The present invention is explained in detail below. The aqueous ink composition of the present invention is characterized by containing a water-soluble and near-infrared absorbing coloring matter represented by the above formula (1) or a salt thereof. More specifically, it was found that a coloring matter designed with a naphthalocyanine moiety to serve in near-infrared absorption, and a substituted sulfamoyl moiety having a triazine ring introduced with an ionic hydrophilic group to serve in providing water solubility is very suited for aqueous ink compositions, and such an ink exhibits extremely favorable storage stability. It is to be noted that the coloring matter represented by the above formula (1) or a salt thereof is a mixture. Hereafter, for the sake of simplicity herein, "the coloring matter or a salt thereof of the present invention" is briefly referred to as "the coloring matter of the present invention" to include both compounds.

In the above formula (1), Nc represents naphthalocyanine which may, in addition to substituted sulfamoyl groups having a triazine ring represented by the formula (4) described later the number of substitution therewith is represented by k, and unsubstituted sulfamoyl groups the number of substitution therewith is represented by p, further have one or at least two different types of substituents in the number of typically no less than 0 and no greater than 8, preferably no less than 0 and no greater than 6, and more preferably no less than 0 and no greater than 4, both on average. Examples of the substituent which may be further contained include a chlorine atom; an amino group; an acetylamino group; a sulfo group; a carboxy group; a carbamoyl group; unsubstituted alkyl groups; substituted or unsubstituted alkoxy groups; substituted or unsubstituted phenoxy groups; substituted or unsubstituted naphthoxy groups; substituted or unsubstituted aralkyloxy groups; substituted or unsubstituted mono- or dialkylamino groups; substituted or unsubstituted phenylamino groups; substituted or unsubstituted naphthylamino groups; substituted or unsubstituted benzoylamino groups; substituted or unsubstituted alkylthio groups; substituted or an unsubstituted phenylthio group; substituted or unsubstituted naphthylthio groups; and the like.

Of the substituents which may be contained in Nc, the unsubstituted alkyl group may be linear, branched, or cyclic, and linear or branched alkyl groups are preferred. The number of carbon atoms is typically from 1 to 8, preferably from 1 to 6, and more preferably from 1 to 4. Specific examples include, linear alkyl such as methyl, ethyl, n-propyl, n-butyl, n-pentyl, n-hexyl, n-heptyl, and n-octyl; branched alkyl such as isopropyl, isobutyl, sec-butyl, tert-butyl, 2,2-dimethylpropyl, isopentyl, sec-pentyl, and 2-methylbutyl; cyclic alkyl such as cyclopentyl, cyclohexyl, cycloheptyl, and cyclooctyl; and the like.

Of the substituents which may be contained in Nc, the unsubstituted alkoxy group may include groups having a linear or branched chain, or having a cyclic structure at the alkyl moiety, and groups having a linear or branched chain are preferred. The number of carbon atoms is typically from 1 to 8, preferably from 1 to 6, and more preferably from 1 to 4. Specific examples include types having a linear chain such as methoxy, ethoxy, n-propoxy, n-butoxy, n-pentyloxy, n-hexyloxy, n-heptyloxy, and n-octyloxy; types having a branched chain such as isopropoxy, isobutyloxy, sec-butoxy, tert-butoxy, 2,2-dimethylpropoxy, isopentyloxy, sec-pentyloxy, and 2-methylbutyloxy; types having a cyclic structure at the alkyl moiety such as cyclopropylmethyloxy, cyclobutylmethyloxy, cyclopentyloxy, cyclohexyloxy, cyclohexylmethyloxy, cycloheptyloxy, and cyclooctyloxy; and the like.

Similarly, the substituted alkoxy group may be the aforementioned unsubstituted alkoxy group further having a substituent, and the substituent may be exemplified by a hydroxy group, a carboxy group, a carbamoyl group, a sulfo group, a sulfamoyl group, and the like. The substituted alkoxy group has carbon atoms of preferably from 2 to 4. Specific examples thereof include hydroxy-substituted types such as 2-hydroxyethoxy, 2-hydroxypropoxy, 3-hydroxypropoxy, and 4-hydroxybutoxy; carboxy-substituted types such as 2-carboxyethoxy, 2-carboxypropoxy, 3-carboxypropoxy, and 4-carboxybutoxy; carbamoyl-substituted types such as 2-carbamoylethoxy, 2-carbamoylpropoxy, 3-carbamoylpropoxy, and 4-carbamoylbutoxy; sulfo-substituted types such as 2-sulfoethoxy, 3-sulfopropoxy, and 4-sulfobutoxy; sulfamoyl-substituted types such as 2-sulfamoylethoxy, 3-sulfamoylpropoxy, and 4-sulfamoylbutoxy; and the like.

Among these, C2-C4 alkoxy groups having substitution with a hydroxy group, a carbamoyl group, or a sulfamoyl group are preferred, and hydroxy-substituted C2-C4 alkoxy groups are more preferred.

Of the substituents which may be further contained in Nc, the substituent of the substituted phenoxy group is exemplified by a chlorine atom, unsubstituted C1-C4 alkyl groups, unsubstituted C1-C4 alkoxy groups, a carboxy group, a carbamoyl group, a sulfo group, a sulfamoyl group, and the like. The number of the substituent is typically from 1 to 3, and preferably 1 or 2. Any of these groups is substituted on the benzene ring. Specific examples include chlorine atom-substituted types such as 2-chlorophenoxy, 3-chlorophenoxy, 4-chlorophenoxy, 2,3-dichlorophenoxy, 2,4-dichlorophenoxy, 2,5-dichlorophenoxy, 2,6-dichlorophenoxy, 3,4-dichlorophenoxy, 3,5-dichlorophenoxy, 2,4,6-trichlorophenoxy, and 2,3,4,5,6-pentachlorophenoxy; linear C1-C4 alkyl group-substituted types such as 2-methylphenoxy, 3-methylphenoxy, 4-methylphenoxy, 2-ethylphenoxy, 3-ethylphenoxy, 4-ethylphenoxy, 2-(n-propyl)phenoxy, 3-(n-propyl)phenoxy, 4-(n-propyl)phenoxy, 2-(n-butyl)phenoxy, 3-(n-butyl)phenoxy, and 4-(n-butyl)phenoxy; branched C1-C4 alkyl group-substituted types such as 2-isopropylphenoxy, 3-isopropylphenoxy, 4-isopropylphenoxy, 2-(sec-butyl)phenoxy, 3-(sec-butyl)phenoxy, 4-(sec-butyl)phenoxy, 2-(tert-butyl)phenoxy, 3-(tert-butyl)phenoxy, and 4-(tert-butyl)phenoxy; types substituted with two linear and/or branched C1-C4 alkyl groups in total such as 2,3-dimethylphenoxy, 2,4-dimethylphenoxy, 2,5-dimethylphenoxy, 2,6-dimethylphenoxy, 3,4-dimethylphenoxy, 3,5-dimethylphenoxy, 2-isopropyl-6-methylphenoxy, 5-isopropyl-2-methylphenoxy, 4-isopropyl-3-methylphenoxy, 2-(tert-butyl)-4-methylphenoxy, 2-(tert-butyl)-4-ethylphenoxy, 2,4-di-(tert-butyl)phenoxy, and 2,6-di-(tert-butyl)phenoxy; types substituted with three linear C1-C4 alkyl groups such as 2,3,5-trimethylphenoxy, 2,3,6-trimethylphenoxy, and 2,4,6-trimethylphenoxy; linear C1-C4 alkoxy group-substituted types such as 2-methoxyphenoxy, 3-methoxyphenoxy, 4-methoxyphenoxy, 2-ethoxyphenoxy, 3-ethoxyphenoxy, 4-ethoxyphenoxy, 2-(n-propoxy)phenoxy, 3-(n-propoxy)phenoxy, 4-(n-propoxy)phenoxy, 2-(n-butoxy)phenoxy, 3-(n-butoxy)phenoxy, and 4-(n-butoxy)phenoxy; branched C1-C4 alkoxy group-substituted types such as 2-isopropoxyphenoxy, 3-isopropoxyphenoxy, 4-isopropoxyphenoxy, 2-(sec-butoxy)phenoxy, 3-(sec-butoxy)phenoxy, 4-(sec-butoxy)phenoxy, 2-(tert-butoxy)phenoxy, 3-(tert-butoxy)phenoxy, and 4-(tert-butoxy)phenoxy; mono- or di-carboxy-substituted types such as 2-carboxyphenoxy, 3-carboxyphenoxy, 4-carboxyphenoxy, 2,4-dicarboxyphenoxy, 3,4-dicarboxyphenoxy, and 3,5-dicarboxyphenoxy; mono- or di-carbamoyl-substituted types such as 2-carbamoylphenoxy, 3-carbamoylphenoxy, 4-carbamoylphenoxy, 2,4-dicarbamoylphenoxy, 3,4-dicarbamoylphenoxy, and 3,5-dicarbamoylphenoxy; mono- or di-sulfo-substituted types such as a 2-sulfophenoxy group, a 3-sulfophenoxy group, and a 4-sulfophenoxy group; sulfamoyl-substituted types such as a 2-sulfamoylphenoxy group, a 3-sulfamoylphenoxy group, and a 4-sulfamoylphenoxy group; types substituted with multiple kinds of groups of the aforementioned substituents such as 2-chloro-5-methylphenoxy, 4-chloro-2-methylphenoxy, 2,6-dichloro-4-methylphenoxy, 4-chloro-2-methoxyphenoxy, 2-chloro-4-methoxyphenoxy, 2-carboxy-4-chlorophenoxy, 4-carboxy-2-chlorophenoxy, 4-carboxy-2,4-dichlorophenoxy, 2-carbamoyl-4-chlorophenoxy, 4-carbamoyl-2-chlorophenoxy, 4-carbamoyl-2,4-dichlorophenoxy, 2-chloro-4-sulfophenoxy, 3-chloro-4-sulfophenoxy, 4-chloro-2-sulfophenoxy, 4,6-dichloro-2-sulfophenoxy, 2-chloro-4-sulfamoylphenoxy, 3-chloro-4-sulfamoylphenoxy, 4-chloro-2-sulfamoylphenoxy, 4,6-dichloro-2-sulfamoylphenoxy, 2-methoxy-4-methylphenoxy, 2-methoxy-4-ethylphenoxy, 2-methoxy-5-methylphenoxy, 3-methoxy-5-methylphenoxy, 2-carboxy-4-methylphenoxy, 2-carboxy-5-methylphenoxy, 2-carboxy-6-methylphenoxy, 3-carboxy-2-methylphenoxy, 5-carboxy-2-methylphenoxy, 2-carbamoyl-4-methylphenoxy, 2-carbamoyl-5-methylphenoxy, 2-carbamoyl-6-methylphenoxy, 3-carbamoyl-2-methylphenoxy, 5-carbamoyl-2-methylphenoxy, 2-carboxy-3-methoxyphenoxy, 2-carboxy-4-methoxyphenoxy, 2-carboxy-5-methoxyphenoxy, 2-carbamoyl-3-methoxyphenoxy, 2-carbamoyl-4-methoxyphenoxy, 2-carbamoyl-5-methoxyphenoxy, 2-methoxy-4-sulfophenoxy, 2-methoxy-4-sulfamoylphenoxy, 4-carbamoyl-2-carboxyphenoxy, 2-carbamoyl-4-carboxyphenoxy, 4-carbamoyl-3-carboxyphenoxy, 3-carbamoyl-4-carboxyphenoxy, 5-carbamoyl-3-carboxyphenoxy, 2-carboxy-3-sulfophenoxy, 2-carbamoyl-3-sulfophenoxy, 2-carboxy-3-sulfamoylphenoxy, and 2-carbamoyl-3-sulfamoylphenoxy; and the like.

Among these, phenoxy groups substituted with an unsubstituted C1-C4 alkyl group or an unsubstituted C1-C4 alkoxy group are preferred, and phenoxy groups substituted with an unsubstituted C1-C4 alkoxy group are more preferred.

Of the substituents which may be further contained in Nc, specific examples of the unsubstituted naphthoxy group include, for example, naphth-1-yloxy, naphth-2-yloxy, and the like.

Similarly, examples of the substituted naphthoxy group include naphthoxy groups having a chlorine atom, a carboxy group, a carbamoyl group, a sulfo group, a sulfamoyl group or the like as a substituent. The number of the substituent is typically from 1 to 3, and preferably 1 or 2. Specific examples thereof include chlorine atom-substituted types such as 2-chloronaphth-1-yloxy, 4-chloronaphth-1-yloxy, and 2,4-dichloronaphth-1-yloxy; carboxy-substituted types such as 2-carboxynaphth-1-yloxy, 1-carboxynaphth-2-yloxy, 3-carboxynaphth-2-yloxy, 5-carboxynaphth-2-yloxy, and 6-carboxynaphth-2-yloxy; carbamoyl-substituted types such as 2-carbamoylnaphth-1-yloxy, 1-carbamoylnaphth-2-yloxy, 3-carbamoylnaphth-2-yloxy, 5-carbamoylnaphth-2-yloxy, and 6-carbamoylnaphth-2-yloxy; mono or di sulfo-substituted types such as 3-sulfonaphth-1-yloxy, 4-sulfonaphth-1-yloxy, 5-sulfonaphth-1-yloxy, 8-sulfonaphth-1-yloxy, 6-sulfonaphth-2-yloxy, 7-sulfonaphth-2-yloxy, 8-sulfonaphth-2-yloxy, 3,6-disulfonaphth-1-yloxy, and 6,8-disulfonaphth-2-yloxy; mono or di sulfamoyl-substituted types such as 3-sulfamoylnaphth-1-yloxy, 4-sulfamoylnaphth-1-yloxy, 5-sulfamoylnaphth-1-yloxy, 8-sulfamoylnaphth-1-yloxy, 6-sulfamoylnaphth-2-yloxy, 7-sulfamoylnaphth-2-yloxy, 8-sulfamoylnaphth-2-yloxy, 3,6-disulfamoylnaphth-1-yloxy, and 6,8-disulfamoylnaphth-2-yloxy; naphthoxy groups substituted with multiple kinds of the aforementioned substituents such as 2-chloro-4-sulfonaphth-1-yloxy, 2-chloro-5-sulfonaphth-1-yloxy, 2-chloro-8-sulfonaphth-1-yloxy, 4-chloro-3-sulfonaphth-1-yloxy, 4-chloro-8-sulfonaphth-1-yloxy, 2,4-dichloro-8-sulfonaphth-1-yloxy, 2-chloro-4-sulfamoylnaphth-1-yloxy, 2-chloro-5-sulfamoylnaphth-1-yloxy, 2-chloro-8-sulfamoylnaphth-1-yloxy, 4-chloro-3-sulfamoylnaphth-1-yloxy, 4-chloro-8-sulfamoylnaphth-1-yloxy, 2,4-dichloro-8-sulfamoylnaphth-1-yloxy, 2-carboxy-4-sulfonaphth-1-yloxy, 2-carboxy-5-sulfonaphth-1-yloxy, 1-carboxy-6-sulfonaphth-2-yloxy, 1-carboxy-7-sulfonaphth-2-yloxy, 3-carboxy-6-sulfonaphth-2-yloxy, 3-carboxy-7-sulfonaphth-2-yloxy, 3-carboxy-8-sulfonaphth-2-yloxy, 5-carboxy-3-sulfonaphth-2-yloxy, 5-carboxy-7-sulfonaphth-2-yloxy, 6-carboxy-3-sulfonaphth-2-yloxy, 6-carboxy-8-sulfonaphth-2-yloxy, 2-carboxy-4-sulfamoylnaphth-1-yloxy, 2-carboxy-5-sulfamoylnaphth-1-yloxy, 1-carboxy-6-sulfamoylnaphth-2-yloxy, 1-carboxy-7-sulfamoylnaphth-2-yloxy, 3-carboxy-6-sulfamoylnaphth-2-yloxy, 3-carboxy-7-sulfamoylnaphth-2-yloxy, 3-carboxy-8-sulfamoylnaphth-2-yloxy, 5-carboxy-3-sulfamoylnaphth-2-yloxy, 5-carboxy-7-sulfamoylnaphth-2-yloxy, 6-carboxy-3-sulfamoylnaphth-2-yloxy, 6-carboxy-8-sulfamoylnaphth-2-yloxy, 2-carbamoyl-4-sulfonaphth-1-yloxy, 2-carbamoyl-5-sulfonaphth-1-yloxy, 1-carbamoyl-6-sulfonaphth-2-yloxy, 1-carbamoyl-7-sulfonaphth-2-yloxy, 3-carbamoyl-6-sulfonaphth-2-yloxy, 3-carbamoyl-7-sulfonaphth-2-yloxy, 3-carbamoyl-8-sulfonaphth-2-yloxy, 5-carbamoyl-3-sulfonaphth-2-yloxy, 5-carbamoyl-7-sulfonaphth-2-yloxy, 6-carbamoyl-3-sulfonaphth-2-yloxy, 6-carbamoyl-8-sulfonaphth-2-yloxy, 2-carbamoyl-4-sulfamoylnaphth-1-yloxy, 2-carbamoyl-5-sulfamoylnaphth-1-yloxy, 1-carbamoyl-6-sulfamoylnaphth-2-yloxy, 1-carbamoyl-7-sulfamoylnaphth-2-yloxy, 3-carbamoyl-6-sulfamoylnaphth-2-yloxy, 3-carbamoyl-7-sulfamoylnaphth-2-yloxy, 3-carbamoyl-8-sulfamoylnaphth-2-yloxy, 5-carbamoyl-3-sulfamoylnaphth-2-yloxy, 5-carbamoyl-7-sulfamoylnaphth-2-yloxy, 6-carbamoyl-3-sulfamoylnaphth-2-yloxy, 6-carbamoyl-8-sulfamoylnaphth-2-yloxy, 3-sulfamoyl-6-sulfonaphth-1-yloxy, 6-sulfamoyl-3-sulfonaphth-1-yloxy, 6-sulfamoyl-8-sulfonaphth-2-yloxy, and 8-sulfamoyl-6-sulfonaphth-1-yloxy; and the like.

Among these, naphthoxy groups substituted with a carbamoyl group or a sulfamoyl group are preferred, and naphthoxy groups substituted with a sulfamoyl group are more preferred.

Of the substituents which may be further contained in Nc, examples of the unsubstituted aralkyloxy group include phenyl C1-C6 alkoxy groups and the like, and specific examples thereof include phenylmethoxy, phenethyloxy, 3-phenylpropoxy, 4-phenylbutoxy, and the like.

Similarly, examples of the substituted aralkyloxy group include aralkyloxy groups having a chlorine atom, a methyl group, a methoxy group, a sulfo group, a sulfamoyl group or the like as a substituent of the benzene ring. The number of the substituent is typically from 1 to 3, and preferably 1 or 2. Specific examples thereof include chlorine atom-substituted types such as (2-chlorophenyl)methoxy, (3-chlorophenyl)methoxy, (4-chlorophenyl)methoxy, (2,4-dichlorophenyl)methoxy, (3,4-dichlorophenyl)methoxy, 2-(2-chlorophenyl)ethoxy, 2-(4-chlorophenyl)ethoxy, 2-(2,4-dichlorophenyl)ethoxy, 3-(2-chlorophenyl)propoxy, 3-(4-chlorophenyl)propoxy, 3-(2,4-dichlorophenyl)propoxy, 4-(2-chlorophenyl)butoxy, 4-(4-chlorophenyl)butoxy, and 4-(2,4-dichlorophenyl)butoxy; methyl-substituted types such as (2-methylphenyl)methoxy, (3-methylphenyl)methoxy, (4-methylphenyl)methoxy, 2-(2-methylphenyl)ethoxy, 2-(3-methylphenyl)ethoxy, and 2-(4-methylphenyl)ethoxy; methoxy-substituted types such as (2-methoxyphenyl)methoxy, (3-methoxyphenyl)methoxy, (4-methoxyphenyl)methoxy, 2-(2-methoxyphenyl)ethoxy, 2-(3-methoxyphenyl)ethoxy, and 2-(4-methoxyphenyl)ethoxy; sulfo-substituted types such as (2-sulfophenyl)methoxy, (4-sulfophenyl)methoxy, (2,4-disulfophenyl)methoxy, 2-(2-sulfophenyl)ethoxy, 2-(4-sulfophenyl)ethoxy, 2-(2,4-disulfophenyl)ethoxy, 3-(2-sulfophenyl)propoxy, 3-(4-sulfophenyl)propoxy, 3-(2,4-disulfophenyl)propoxy, 4-(2-sulfophenyl)butoxy, 4-(4-sulfophenyl)butoxy, and 4-(2,4-disulfophenyl)butoxy; sulfamoyl-substituted types such as (2-sulfamoylphenyl)methoxy, (4-sulfamoylphenyl)methoxy, (2,4-disulfamoylphenyl)methoxy, 2-(2-sulfamoylphenyl)ethoxy, 2-(4-sulfamoylphenyl)ethoxy, 2-(2,4-disulfamoylphenyl)ethoxy, 3-(2-sulfamoylphenyl)propoxy, 3-(4-sulfamoylphenyl)propoxy, 3-(2,4-disulfamoylphenyl)propoxy, 4-(2-sulfamoylphenyl)butoxy, 4-(4-sulfamoylphenyl)butoxy, and 4-(2,4-disulfamoylphenyl)butoxy; aralkyloxy groups substituted with multiple kinds of the aforementioned substituents such as (2-chloro-4-sulfophenyl)methoxy, (2-chloro-6-sulfophenyl)methoxy, (3-chloro-4-sulfophenyl)methoxy, (5-chloro-2-sulfophenyl)methoxy, (4-chloro-2-sulfophenyl)methoxy, 2-(2-chloro-4-sulfophenyl)ethoxy, 2-(2-chloro-6-sulfophenyl)ethoxy, 2-(4-chloro-2-sulfophenyl)ethoxy, 3-(2-chloro-4-sulfophenyl)propoxy, 3-(2-chloro-6-sulfophenyl)propoxy, 3-(4-chloro-2-sulfophenyl)propoxy, 4-(2-chloro-4-sulfophenyl)butoxy, 4-(2-chloro-6-sulfophenyl)butoxy, 4-(4-chloro-2-sulfophenyl)butoxy, (2-chloro-4-sulfamoylphenyl)methoxy, (2-chloro-6-sulfamoylphenyl)methoxy, (3-chloro-4-sulfamoylphenyl)methoxy, (5-chloro-2-sulfamoylphenyl)methoxy, (4-chloro-2-sulfamoylphenyl)methoxy, 2-(2-chloro-4-sulfamoylphenyl)ethoxy, 2-(2-chloro-6-sulfamoylphenyl)ethoxy, 2-(4-chloro-2-sulfamoylphenyl)ethoxy, 3-(2-chloro-4-sulfamoylphenyl)propoxy, 3-(2-chloro-6-sulfamoylphenyl)propoxy, 3-(4-chloro-2-sulfamoylphenyl)propoxy, 4-(2-chloro-4-sulfamoylphenyl)butoxy, 4-(2-chloro-6-sulfamoylphenyl)butoxy, 4-(4-chloro-2-sulfamoylphenyl)butoxy, (2-methyl-3-sulfophenyl)methoxy, (2-methyl-4-sulfophenyl)methoxy, (2-methyl-5-sulfophenyl)methoxy, (2-methyl-6-sulfophenyl)methoxy, (2-methyl-3,5-disulfophenyl)methoxy, (2-methyl-4,6-disulfophenyl)methoxy, (3-methyl-2-sulfophenyl)methoxy, (3-methyl-4-sulfophenyl)methoxy, (5-methyl-2-sulfophenyl)methoxy, (3-methyl-2,4-disulfophenyl)methoxy, (3-methyl-2,6-disulfophenyl)methoxy, (5-methyl-2,4-disulfophenyl)methoxy, (4-methyl-2-sulfophenyl)methoxy, (4-methyl-3-sulfophenyl)methoxy, (4-methyl-5-sulfophenyl)methoxy, (4-methyl-6-sulfophenyl)methoxy, (4-methyl-2,6-disulfophenyl)methoxy, (4-methyl-3,5-disulfophenyl)methoxy, 2-(2-methyl-3-sulfophenyl)ethoxy, 2-(2-methyl-4-sulfophenyl)ethoxy, 2-(2-methyl-5-sulfophenyl)ethoxy, 2-(2-methyl-6-sulfophenyl)ethoxy, 2-(2-methyl-3,5-disulfophenyl)ethoxy, 2-(2-methyl-4,6-disulfophenyl)ethoxy, 2-(3-methyl-2-sulfophenyl)ethoxy, 2-(3-methyl-4-sulfophenyl)ethoxy, 2-(5-methyl-2-sulfophenyl)ethoxy, 2-(3-methyl-2,4-disulfophenyl)ethoxy, 2-(3-methyl-2,6-disulfophenyl)ethoxy, 2-(5-methyl-2,4-disulfophenyl)ethoxy, 2-(4-methyl-2-sulfophenyl)ethoxy, 2-(4-methyl-3-sulfophenyl)ethoxy, 2-(4-methyl-5-sulfophenyl)ethoxy, 2-(4-methyl-6-sulfophenyl)ethoxy, 2-(4-methyl-2,6-disulfophenyl)ethoxy, 2-(4-methyl-3,5-disulfophenyl)ethoxy, (2-methyl-3-sulfamoylphenyl)methoxy, (2-methyl-4-sulfamoylphenyl)methoxy, (2-methyl-5-sulfamoylphenyl)methoxy, (2-methyl-6-sulfamoylphenyl)methoxy, (2-methyl-3,5-disulfamoylphenyl)methoxy, (2-methyl-4,6-disulfamoylphenyl)methoxy, (3-methyl-2-sulfamoylphenyl)methoxy, (3-methyl-4-sulfamoylphenyl)methoxy, (5-methyl-2-sulfamoylphenyl)methoxy, (3-methyl-2,4-disulfamoylphenyl)methoxy, (3-methyl-2,6-disulfamoylphenyl)methoxy, (5-methyl-2,4-disulfamoylphenyl)methoxy, (4-methyl-2-sulfamoylphenyl)methoxy, (4-methyl-3-sulfamoylphenyl)methoxy, (4-methyl-5-sulfamoylphenyl)methoxy, (4-methyl-6-sulfamoylphenyl)methoxy, (4-methyl-2,6-disulfamoylphenyl)methoxy, (4-methyl-3,5-disulfamoylphenyl)methoxy, 2-(2-methyl-3-sulfamoylphenyl)ethoxy, 2-(2-methyl-4-sulfamoylphenyl)ethoxy, 2-(2-methyl-5-sulfamoylphenyl)ethoxy, 2-(2-methyl-6-sulfamoylphenyl)ethoxy, 2-(2-methyl-3,5-disulfamoylphenyl)ethoxy, 2-(2-methyl-4,6-disulfamoylphenyl)ethoxy, 2-(3-methyl-2-sulfamoylphenyl)ethoxy, 2-(3-methyl-4-sulfamoylphenyl)ethoxy, 2-(5-methyl-2-sulfamoylphenyl)ethoxy, 2-(3-methyl-2,4-disulfamoylphenyl)ethoxy, 2-(3-methyl-2,6-disulfamoylphenyl)ethoxy, 2-(5-methyl-2,4-disulfamoylphenyl)ethoxy, 2-(4-methyl-2-sulfamoylphenyl)ethoxy, 2-(4-methyl-3-sulfamoylphenyl)ethoxy, 2-(4-methyl-5-sulfamoylphenyl)ethoxy, 2-(4-methyl-6-sulfamoylphenyl)ethoxy, 2-(4-methyl-2,6-disulfamoylphenyl)ethoxy, 2-(4-methyl-3,5-disulfamoylphenyl)ethoxy, (2-methoxy-3-sulfophenyl)methoxy, (2-methoxy-5-sulfophenyl)methoxy, (2-methoxy-3,5-disulfophenyl)methoxy, (3-methoxy-2-sulfophenyl)methoxy, (3-methoxy-4-sulfophenyl)methoxy, (5-methoxy-2-sulfophenyl)methoxy, (3-methoxy-2,6-disulfophenyl)methoxy, (5-methoxy-2,4-disulfophenyl)methoxy, (4-methoxy-3-sulfophenyl)methoxy, (4-methoxy-3,5-disulfophenyl)methoxy, 2-(2-methoxy-3-sulfophenyl)ethoxy, 2-(2-methoxy-5-sulfophenyl)ethoxy, 2-(2-methyl-3,5-disulfophenyl)ethoxy, 2-(3-methoxy-2-sulfophenyl)ethoxy, 2-(3-methoxy-4-sulfophenyl)ethoxy, 2-(5-methoxy-2-sulfophenyl)ethoxy, 2-(3-methoxy-2,6-disulfophenyl)ethoxy, 2-(5-methoxy-2,4-disulfophenyl)ethoxy, 2-(4-methoxy-3-sulfophenyl)ethoxy, 2-(4-methoxy-3,5-disulfophenyl)ethoxy, (2-methoxy-3-sulfamoylphenyl)methoxy, (2-methoxy-5-sulfamoylphenyl)methoxy, (2-methoxy-3,5-disulfamoylphenyl)methoxy, (3-methoxy-2-sulfamoylphenyl)methoxy, (3-methoxy-4-sulfamoylphenyl)methoxy, (5-methoxy-2-sulfamoylphenyl)methoxy, (3-methoxy-2,6-disulfamoylphenyl)methoxy, (5-methoxy-2,4-disulfamoylphenyl)methoxy, (4-methoxy-3-sulfamoylphenyl)methoxy, (4-methoxy-3,5-disulfamoylphenyl)methoxy, 2-(2-methoxy-3-sulfamoylphenyl)ethoxy, 2-(2-methoxy-5-sulfamoylphenyl)ethoxy, 2-(2-methoxy-3,5-disulfamoylphenyl)ethoxy, 2-(3-methoxy-2-sulfamoylphenyl)ethoxy, 2-(3-methoxy-4-sulfamoylphenyl)ethoxy, 2-(5-methoxy-2-sulfamoylphenyl)ethoxy, 2-(3-methoxy-2,6-disulfamoylphenyl)ethoxy, 2-(5-methoxy-2,4-disulfamoylphenyl)ethoxy, 2-(4-methoxy-3-sulfamoylphenyl)ethoxy, 2-(4-methoxy-3,5-disulfamoylphenyl)ethoxy, (2-sulfamoyl-4-sulfophenyl)methoxy, (4-sulfamoyl-2-sulfophenyl)methoxy, 2-(2-sulfamoyl-4-sulfophenyl)ethoxy, 2-(4-sulfamoyl-2-sulfophenyl)ethoxy, 3-(2-sulfamoyl-4-sulfophenyl)propoxy, 3-(4-sulfamoyl-2-sulfophenyl)propoxy, 4-(2-sulfamoyl-4-sulfophenyl)butoxy, 4-(4-sulfamoyl-2-sulfophenyl)butoxy, (2-methyl-3-sulfamoyl-5-sulfophenyl)methoxy, (2-methyl-5-sulfamoyl-3-sulfophenyl)methoxy, (2-methyl-4-sulfamoyl-6-sulfophenyl)methoxy, (2-methyl-6-sulfamoyl-4-sulfophenyl)methoxy, (3-methyl-2-sulfamoyl-4-sulfophenyl)methoxy, (3-methyl-4-sulfamoyl-2-sulfophenyl)methoxy, (3-methyl-2-sulfamoyl-6-sulfophenyl)methoxy, (3-methyl-6-sulfamoyl-2-sulfophenyl)methoxy, (5-methyl-2-sulfamoyl-4-sulfophenyl)methoxy, (5-methyl-4-sulfamoyl-2-sulfophenyl)methoxy, (4-methyl-2-sulfamoyl-6-sulfophenyl)methoxy, (4-methyl-6-sulfamoyl-2-sulfophenyl)methoxy, (4-methyl-3-sulfamoyl-5-sulfophenyl)methoxy, (4-methyl-5-sulfamoyl-3-sulfophenyl)methoxy, 2-(2-methyl-3-sulfamoyl-5-sulfophenyl)ethoxy, 2-(2-methyl-5-sulfamoyl-3-sulfophenyl)ethoxy, 2-(2-methyl-4-sulfamoyl-6-sulfophenyl)ethoxy, 2-(2-methyl-6-sulfamoyl-4-sulfophenyl)ethoxy, 2-(3-methyl-2-sulfamoyl-4-sulfophenyl)ethoxy, 2-(3-methyl-4-sulfamoyl-2-sulfophenyl)ethoxy, 2-(3-methyl-2-sulfamoyl-6-sulfophenyl)ethoxy, 2-(3-methyl-6-sulfamoyl-2-sulfophenyl)ethoxy, 2-(5-methyl-2-sulfamoyl-4-sulfophenyl)ethoxy, 2-(5-methyl-4-sulfamoyl-2-sulfophenyl)ethoxy, 2-(4-methyl-2-sulfamoyl-6-sulfophenyl)ethoxy, 2-(4-methyl-6-sulfamoyl-2-sulfophenyl)ethoxy, 2-(4-methyl-3-sulfamoyl-5-sulfophenyl)ethoxy, 2-(4-methyl-5-sulfamoyl-3-sulfophenyl)ethoxy, (2-methoxy-3-sulfamoyl-5-sulfophenyl)methoxy, (2-methoxy-5-sulfamoyl-3-sulfophenyl)methoxy, (3-methoxy-2-sulfamoyl-6-sulfophenyl)methoxy, (3-methoxy-6-sulfamoyl-2-sulfophenyl)methoxy, (5-methoxy-2-sulfamoyl-4-sulfophenyl)methoxy, (5-methoxy-4-sulfamoyl-2-sulfophenyl)methoxy, (4-methoxy-3-sulfamoyl-5-sulfophenyl)methoxy, (4-methoxy-5-sulfamoyl-3-sulfophenyl)methoxy, 2-(2-methoxy-3-sulfamoyl-5-sulfophenyl)ethoxy, 2-(2-methoxy-5-sulfamoyl-3-sulfophenyl)ethoxy, 2-(3-methoxy-2-sulfamoyl-6-sulfophenyl)ethoxy, 2-(3-methoxy-6-sulfamoyl-2-sulfophenyl)ethoxy, 2-(5-methoxy-2-sulfamoyl-4-sulfophenyl)ethoxy, 2-(5-methoxy-4-sulfamoyl-2-sulfophenyl)ethoxy, 2-(4-methoxy-3-sulfamoyl-5-sulfophenyl)ethoxy, and 2-(4-methoxy-5-sulfamoyl-3-sulfophenyl)ethoxy; and the like.

Among these, aralkyloxy groups substituted with a chlorine atom, a methyl group, or a sulfamoyl group are preferred, and sulfamoyl-substituted aralkyloxy groups are more preferred.

Of the substituents which may be further contained in Nc, a linear or branched mono C1-C4 alkylamino group or a di(C1-C4 alkyl)amino group is exemplified as the unsubstituted mono- or di-alkylamino group, and linear unsubstituted di C1-C4 alkylamino groups are preferred. Specific examples thereof include linear alkylamino such as methylamino, ethylamino, n-propylamino, n-butylamino, dimethylamino, diethylamino, di-n-propylamino, and di-n-butylamino; branched alkylamino such as isopropylamino, sec-butylamino, tert-butylamino, and diisopropylamino; and the like. Similarly, the substituents in the substituted mono- or di-alkylamino group may be exemplified by a hydroxy group, a carboxy group, a carbamoyl group, a sulfo group, a sulfamoyl group or the like, and when a substituent is contained, a mono- or di-C2-C4 alkylamino group is preferred. Specific examples thereof include hydroxy-substituted types such as 2-hydroxyethylamino, 3-hydroxypropylamino, 4-hydroxybutylamino, 2,2'-dihydroxydiethylamino, 3,3'-dihydroxydipropylamino, and 4,4'-dihydroxydibutylamino; carboxy-substituted types such as 2-carboxyethylamino, 3-carboxypropylamino, 4-carboxybutylamino, 2,2'-dicarboxydiethylamino, 3,3'-dicarboxydipropylamino, and 4,4'-dicarboxydibutylamino; carbamoyl-substituted types such as 2-carbamoylethylamino, 3-carbamoylpropylamino, 4-carbamoylbutylamino, 2,2'-dicarbamoyldiethylamino, 3,3'-dicarbamoyldipropylamino, and 4,4'-dicarbamoyldibutylamino; sulfo-substituted types such as 2-sulfoethylamino, 3-sulfopropylamino, 4-sulfobutylamino, 2,2'-disulfodiethylamino, 3,3'-disulfodipropylamino, and 4,4'-disulfodibutylamino; sulfamoyl-substituted types such as 2-sulfamoylethylamino, 3-sulfamoylpropylamino, 4-sulfamoylbutylamino, 2,2'-disulfamoyldiethylamino, 3,3'-disulfamoyldipropylamino, and 4,4'-disulfamoyldibutylamino; and the like.

Among these, mono- or di-C2-C4 alkylamino groups substituted with a hydroxy group, a carbamoyl group, or a sulfamoyl group are preferred, and hydroxy-substituted mono- or di-C2-C4 alkylamino groups are more preferred.

Of the substituents which may be further contained in Nc, the substituent of the substituted phenylamino group is exemplified by a chlorine atom, unsubstituted C1-C4 alkyl groups, unsubstituted C1-C4 alkoxy groups, a carboxy group, a carbamoyl group, a sulfo group, a sulfamoyl group, and the like. The number of the substituent is typically from 1 to 3, and preferably 1 or 2. Any of these groups is substituted on the benzene ring. Specific examples thereof include chlorine atom-substituted types such as 2-chlorophenylamino, 3-chlorophenylamino, 4-chlorophenylamino, 2,3-dichlorophenylamino, 2,4-dichlorophenylamino, 2,5-dichlorophenylamino, 2,6-dichlorophenylamino, 3,4-dichlorophenylamino, 3,5-dichlorophenylamino, 2,4,6-trichlorophenylamino, and 2,3,4,5,6-pentachlorophenylamino; unsubstituted C1-C4 alkyl-substituted types such as 2-methylphenylamino, 3-methylphenylamino, 4-methylphenylamino, 2-ethylphenylamino, 3-ethylphenylamino, 4-ethylphenylamino, 2-propylphenylamino, 3-propylphenylamino, 4-propylphenylamino, 2-isopropylphenylamino, 3-isopropylphenylamino, 4-isopropylphenylamino, 2-butylphenylamino, 3-butylphenylamino, 4-butylphenylamino, 2-sec-butylphenylamino, 3-sec-butylphenylamino, 4-sec-butylphenylamino, 2-tert-butylphenylamino, 3-tert-butylphenylamino, 4-tert-butylphenylamino, 2,3-dimethylphenylamino, 2,4-dimethylphenylamino, 2,5-dimethylphenylamino, 2,6-dimethylphenylamino, 3,4-dimethylphenylamino, 3,5-dimethylphenylamino, 2,6-diethylphenylamino, 2-ethyl-6-methylphenylamino, 2,6-diisopropylphenylamino, 5-isopropyl-2-methylphenylamino, 2-tert-butyl-6-methylphenylamino, and 2,4,6-trimethylphenylamino; unsubstituted C1-C4 alkoxy-substituted types such as 2-methoxyphenylamino, 3-methoxyphenylamino, 4-methoxyphenylamino, 2-ethoxyphenylamino, 3-ethoxyphenylamino, 4-ethoxyphenylamino, 2-propoxyphenylamino, 3-propoxyphenylamino, 4-propoxyphenylamino, 2-isopropoxyphenylamino, 3-isopropoxyphenylamino, 4-isopropoxyphenylamino, 2-butoxyphenylamino, 3-butoxyphenylamino, 4-butoxyphenylamino, 2-sec-butoxyphenylamino, 3-sec-butoxyphenylamino, 4-sec-butoxyphenylamino, 2-tert-butoxyphenylamino, 3-tert-butoxyphenylamino, 4-tert-butoxyphenylamino, 2,3-dimethoxyphenylamino, 2,4-dimethoxyphenylamino, 2,5-dimethoxyphenylamino, 2,6-dimethoxyphenylamino, 3,4-dimethoxyphenylamino, 3,5-dimethoxyphenylamino, and 3,4,5-trimethoxyphenylamino; carboxy-substituted types such as 2-carboxyphenylamino, 3-carboxyphenylamino, 4-carboxyphenylamino, 2,4-dicarboxyphenylamino, 2,5-dicarboxyphenylamino, 3,4-dicarboxyphenylamino, and 3,5-dicarboxyphenylamino; carbamoyl-substituted types such as 2-carbamoylphenylamino, 3-carbamoylphenylamino, 4-carbamoylphenylamino, 2,4-dicarbamoylphenylamino, 2,5-dicarbamoylphenylamino, 3,4-dicarbamoylphenylamino, and 3,5-dicarbamoylphenylamino; sulfo-substituted types such as a 2-sulfophenylamino group, a 3-sulfophenylamino group, 4-sulfophenylamino, 2,4-disulfophenylamino, 2,5-disulfophenylamino, and a 3,5-disulfophenylamino group; sulfamoyl-substituted types such as a 2-sulfamoylphenylamino group, a 3-sulfamoylphenylamino group, 4-sulfamoylphenylamino, 2,4-disulfamoylphenylamino, 2,5-disulfamoylphenylamino, and a 3,5-disulfamoylphenylamino group; phenylamino groups substituted with multiple kinds of the aforementioned substituents such as 2-chloro-4-methylphenylamino, 2-chloro-6-methylphenylamino, 3-chloro-2-methylphenylamino, 3-chloro-4-methylphenylamino, 4-chloro-2-methylphenylamino-4-chloro-3-methylphenylamino, 5-chloro-2-methylphenylamino, 2-chloro-5-methoxyphenylamino, 4-chloro-3-methoxyphenylamino, 5-chloro-2-methoxyphenylamino, 2,4-dichloro-5-methoxyphenylamino, 2-carboxy-3-chlorophenylamino, 2-carboxy-4-chlorophenylamino, 2-carboxy-5-chlorophenylamino, 3-carboxy-4-chlorophenylamino, 4-carboxy-2-chlorophenylamino, 5-carboxy-2-chlorophenylamino, 6-carboxy-2-chlorophenylamino, 6-carboxy-2,4-dichlorophenylamino, 2-carbamoyl-3-chlorophenylamino, 2-carbamoyl-4-chlorophenylamino, 2-carbamoyl-5-chlorophenylamino, 3-carbamoyl-4-chlorophenylamino, 4-carbamoyl-2-chlorophenylamino, 5-carbamoyl-2-chlorophenylamino, 6-carbamoyl-2-chlorophenylamino, 6-carbamoyl-2,4-dichlorophenylamino, 4-chloro-3-sulfophenylamino, 2,5-dichloro-4-sulfophenylamino, 4,5-dichloro-2-sulfophenylamino, 4-chloro-3-sulfamoylphenylamino, 2,5-dichloro-4-sulfamoylphenylamino, 4,5-dichloro-2-sulfamoylphenylamino, 2-methoxy-5-methylphenylamino, 2-methoxy-6-methylphenylamino, 3-methoxy-2-methylphenylamino, 4-methoxy-2-methylphenylamino, 2-carboxy-3-methylphenylamino, 2-carboxy-4-methylphenylamino, 3-carboxy-2-methylphenylamino, 4-carboxy-2-methylphenylamino, 5-carboxy-2-methylphenylamino, 2-carbamoyl-3-methylphenylamino, 2-carbamoyl-4-methylphenylamino, 3-carbamoyl-2-methylphenylamino, 4-carbamoyl-2-methylphenylamino, 5-carbamoyl-2-methylphenylamino, 4-methyl-2-sulfophenylamino, 2-methyl-4-sulfophenylamino, 3-methyl-4-sulfophenylamino, 4,6-dimethyl-2-sulfophenylamino, 2,4-dimethyl-5-sulfophenylamino, 4-methyl-2-sulfamoylphenylamino, 2-methyl-4-sulfamoylphenylamino, 3-methyl-4-sulfamoylphenylamino, 4,6-dimethyl-2-sulfamoylphenylamino, 2,4-dimethyl-5-sulfamoylphenylamino, 4-carboxy-2-methoxyphenylamino, 5-carboxy-2-methoxyphenylamino, 6-carboxy-2-methoxyphenylamino, 4-carbamoyl-2-methoxyphenylamino, 5-carbamoyl-2-methoxyphenylamino, 6-carbamoyl-2-methoxyphenylamino, 4-methoxy-2-sulfophenylamino, 4-methoxy-3-sulfophenylamino, 2-methoxy-5-sulfophenylamino, 4-methoxy-2-sulfamoylphenylamino, 4-methoxy-3-sulfamoylphenylamino, 2-methoxy-5-sulfamoylphenylamino, 2-carboxy-4-sulfophenylamino, 2-carboxy-5-sulfophenylamino, 2-carbamoyl-4-sulfophenylamino, 2-carbamoyl-5-sulfophenylamino, 2-carboxy-4-sulfamoylphenylamino, 2-carboxy-5-sulfamoylphenylamino, 2-carbamoyl-4-sulfamoylphenylamino, 2-carbamoyl-5-sulfamoylphenylamino, 5-chloro-4-methyl-2-sulfophenylamino, 4-chloro-5-methyl-2-sulfophenylamino, 5-chloro-4-methyl-2-sulfamoylphenylamino, 4-chloro-5-methyl-2-sulfamoylphenylamino, 4-carboxy-2-chloro-5-methoxyphenylamino, 4-carboxy-2-chloro-5-ethoxyphenylamino, 4-carboxy-2-chloro-5-methoxyphenylamino, 4-carbamoyl-2-chloro-5-methoxyphenylamino, 4-carbamoyl-2-chloro-5-ethoxyphenylamino, and 4-carbamoyl-2-chloro-5-methoxyphenylamino; and the like.

Among these, phenylamino groups substituted with a chlorine atom or an unsubstituted C1-C4 alkoxy group are preferred, and phenylamino groups substituted with an unsubstituted C1-C4 alkoxy group are more preferred.

Of the substituents which may be further contained in Nc, the unsubstituted naphthylamino group is exemplified by naphth-1-ylamino and naphth-2-ylamino.

Similarly, the substituent in the substituted naphthylamino group may be exemplified by an unsubstituted C1-C4 alkoxy group, a sulfo group, a sulfamoyl group, and the like. Any of these is substituted on the naphthalene ring. The number of the substituent is preferably 1 or 2. Specific examples thereof include alkoxy-substituted types such as 2-methoxynaphth-1-ylamino, 2-ethoxynaphth-1-ylamino, 2-butoxynaphth-1-ylamino, 4-methoxynaphth-1-ylamino, 4-ethoxynaphth-1-ylamino, 4-butoxynaphth-1-ylamino, 5-methoxynaphth-1-ylamino, 5-ethoxynaphth-1-ylamino, 5-butoxynaphth-1-ylamino, 6-methoxynaphth-1-ylamino, 6-ethoxynaphth-1-ylamino, 6-butoxynaphth-1-ylamino, 7-methoxynaphth-1-ylamino, 7-ethoxynaphth-1-ylamino, 7-butoxynaphth-1-ylamino, 8-methoxynaphth-1-ylamino, 8-ethoxynaphth-1-ylamino, 8-butoxynaphth-1-ylamino, 1-methoxynaphth-2-ylamino, 1-ethoxynaphth-2-ylamino, 1-butoxynaphth-2-ylamino, 3-methoxynaphth-2-ylamino, 3-ethoxynaphth-2-ylamino, 3-butoxynaphth-2-ylamino, 5-methoxynaphth-5-ylamino, 5-ethoxynaphth-2-ylamino, and 5-butoxynaphth-2-ylamino; sulfo-substituted types such as 4-sulfonaphth-1-ylamino, 5-sulfonaphth-1-ylamino, 6-sulfonaphth-1-ylamino, 7-sulfonaphth-1-ylamino, 5-sulfonaphth-2-ylamino, 6-sulfonaphth-2-ylamino, 7-sulfonaphth-2-ylamino, 4,6-disulfonaphth-1-ylamino, 4,7-disulfonaphth-1-ylamino, 4,8-disulfonaphth-2-ylamino, 5,7-disulfonaphth-2-ylamino, and 6,8-disulfonaphth-2-ylamino; sulfamoyl-substituted types such as 4-sulfamoylnaphth-1-ylamino, 5-sulfamoylnaphth-1-ylamino, 6-sulfamoylnaphth-1-ylamino, 7-sulfamoylnaphth-1-ylamino, 5-sulfamoylnaphth- 2-ylamino, 6-sulfamoylnaphth-2-ylamino, 7-sulfamoylnaphth-2-ylamino, 4,6-disulfamoylnaphth-1-ylamino, 4,7-disulfamoylnaphth-1-ylamino, 4,8-disulfamoylnaphth-2-ylamino, 5,7-disulfamoylnaphth-2-ylamino, and 6,8-disulfamoylnaphth-2-ylamino; types substituted with multiple kinds of the aforementioned substituents such as 8-methoxy-4-sulfonaphth-1-ylamino, 5-methoxy-7-sulfonaphth-1-ylamino, 5-methoxy-7-sulfonaphth-2-ylamino, 8-methoxy-5-sulfonaphth-2-ylamino, and 6-methoxy-8-sulfonaphth-2-ylamino; and the like.

Among these, naphthylamino groups substituted with a sulfo group or a sulfamoyl group are preferred, and sulfamoyl-substituted naphthylamino groups are more preferred.

Of the substituents which may be further contained in Nc, the substituent of the substituted benzoylamino group is exemplified by a chlorine atom, an unsubstituted C1-C4 alkyl group, a nitro group, a sulfo group, a sulfamoyl group, and the like. The number of the substituent is typically from 1 to 3, and preferably 1 or 2. Any of these groups is substituted on the benzene ring. Specific examples thereof include chlorine atom-substituted types such as 2-chlorobenzoylamino, 4-chlorobenzoylamino, 2,3-dichlorobenzoylamino, 2,4-dichlorobenzoylamino, 2,5-dichlorobenzoylamino, 2,6-dichlorobenzoylamino, 2,6-dichlorobenzoylamino, 3,4-dichlorobenzoylamino, 3,5-dichlorobenzoylamino, and 2,4,6-trichlorobenzoylamino; unsubstituted C1-C4 alkyl-substituted types such as 2-methylbenzoylamino, 3-methylbenzoylamino, 4-methylbenzoylamino, 4-sec-butylbenzoylamino, 4-isobutylbenzoylamino, 3,5-dimethylbenzoylamino, and 2,4,6-trimethylbenzoylamino; nitro-substituted types such as 2-nitrobenzoylamino, 4-nitrobenzoylamino, and 3,5-dinitrobenzoylamino; sulfo-substituted types such as 2-sulfobenzoylamino, 3-sulfobenzoylamino, and 4-sulfobenzoylamino; sulfamoyl-substituted types such as 2-sulfamoylbenzoylamino, 3-sulfamoylbenzoylamino, and 4-sulfamoylbenzoylamino; benzoylamino groups substituted with multiple kinds of the aforementioned substituents such as 2-chloro-5-nitrobenzoylamino, 4-chloro-3-nitrobenzoylamino, 4-chloro-3-sulfobenzoylamino, 2,4-dichloro-5-sulfobenzoylamino, 4-chloro-3-sulfamoylbenzoylamino, 2,4-dichloro-5-sulfamoylbenzoylamino, 2-methyl-3-nitrobenzoylamino, 6-methyl-2-nitrobenzoylamino, 2-methyl-5-sulfobenzoylamino, 4-methyl-3-sulfobenzoylamino, 2-methyl-5-sulfamoylbenzoylamino, and 4-methyl-3-sulfamoylbenzoylamino; and the like.

Among these, benzoylamino groups substituted with a chlorine atom or a nitro group are preferred, and chlorine atom-substituted benzoylamino groups are more preferred.

Of the substituents which may be further contained in Nc, the unsubstituted alkylthio group is exemplified by groups having a linear or branched chain, or have a cyclic structure at the alkyl moiety. In addition, groups having a linear or branched chain are preferred and groups having a linear chain are more preferred. The number of carbon atoms is typically from 1 to 8, preferably from 1 to 6, and more preferably from 1 to 4. Specific examples include types having a linear chain such as methylthio, ethylthio, n-propylthio, n-butylthio, n-pentylthio, n-hexylthio, n-heptylthio, and n-octylthio; types having a branched chain such as isopropylthio, isobutylthio, sec-butylthio, tert-butylthio, 2,2-dimethylpropylthio, isopentylthio, sec-pentylthio, and 2-methylbutylthio; types having a cyclic structure at the alkyl moiety such as cyclopentylthio, and cyclohexylthio; and the like. Among these, linear unsubstituted C1-C4 alkylthio groups are preferred.

Similarly, the substituent in the substituted alkylthio group may be exemplified by a hydroxy group, a carboxy group, a carbamoyl group, a sulfo group, a sulfamoyl group and the like, and in this case, substituted C2-C4 alkylthio groups are preferred. Specific examples thereof include hydroxy-substituted types such as 2-hydroxyethylthio, 3-hydroxypropylthio, and 4-hydroxybutylthio; carboxy-substituted types such as 2-carboxyethylthio, 2-carboxypropylthio, 3-carboxypropylthio, and 4-carboxybutylthio; carbamoyl-substituted types such as 2-carbamoylethylthio, 2-carbamoylpropylthio, 3-carbamoylpropylthio, and 4-carbamoylbutylthio; sulfo-substituted types such as 2-sulfoethylthio, 3-sulfopropylthio, and 4-sulfobutylthio; sulfamoyl-substituted types such as 2-sulfamoylethylthio, 3-sulfamoylpropylthio, and 4-sulfamoylbutylthio; and the like.

Among these, C2-C4 alkylthio groups substituted with a hydroxy group, a carbamoyl group, or a sulfamoyl group are preferred, and hydroxy-substituted C2-C4 alkylthio groups are more preferred.

Of the substituents which may be further contained in Nc, the substituent in the substituted phenylthio group is exemplified by a chlorine atom, an unsubstituted C1-C4 alkyl group, an unsubstituted C1-C4 alkoxy group, a carboxy group, a carbamoyl group, a sulfo group, a sulfamoyl group, and the like. The number of the substituent is typically from 1 to 5, preferably from 1 to 3, and more preferably 1 or 2. Any of these groups is substituted on the benzene ring. Specific examples thereof include chlorine atom-substituted types such as 2-chlorophenylthio, 3-chlorophenylthio, 4-chlorophenylthio, 2,3-dichlorophenylthio, 2,4-dichlorophenylthio, 2,5-dichlorophenylthio, 2,6-dichlorophenylthio, 3,4-dichlorophenylthio, 3,5-dichlorophenylthio, and 2,3,4,5,6-pentachlorophenylthio; unsubstituted C1-C4 alkyl-substituted types such as 2-methylphenylthio, 3-methylphenylthio, 4-methylphenylthio, 2-ethylphenylthio, 4-ethylphenylthio, 4-isopropylphenylthio, 4-tert-butylphenylthio, 2,4-dimethylphenylthio, 2,5-dimethylphenoxy, 3,4-dimethylphenylthio, and 5-tert-butyl-2-methylphenylthio; unsubstituted C1-C4 alkoxy-substituted types such as 2-methoxyphenylthio, 3-methoxyphenylthio, 4-methoxyphenylthio, 3-ethoxyphenylthio, 4-propoxyphenylthio, and 4-butoxyphenylthio; carboxy-substituted types such as 2-carboxyphenylthio, 3-carboxyphenylthio, and 4-carboxyphenylthio; carbamoyl-substituted types such as 2-carbamoylphenylthio, 3-carbamoylphenylthio, and 4-carbamoylphenylthio; sulfo-substituted types such as 2-sulfophenylthio, 3-sulfophenylthio, and 4-sulfophenylthio; sulfamoyl-substituted types such as 2-sulfamoylphenylthio, 3-sulfamoylphenylthio, and 4-sulfamoylphenylthio; phenylthio groups substituted with the aforementioned multiple kinds of groups such as 2-chloro-4-sulfophenylthio, 3-chloro-4-sulfophenylthio, 4-chloro-2-sulfophenylthio, 2-chloro-4-sulfamoylphenylthio, 3-chloro-4-sulfamoylphenylthio, 4-chloro-2-sulfamoylphenylthio, 2-methyl-4-sulfophenylthio, 3-methyl-4-sulfophenylthio, 4-methyl-2-sulfophenylthio, 2-ethyl-4-sulfophenylthio, 4-ethyl-2-sulfophenylthio, 4-isopropyl-2-sulfophenylthio, 4-tert-butyl-2-sulfophenylthio, 2,4-dimethyl-5-sulfophenylthio, 2,5-dimethyl-6-sulfophenoxy, 3,4-dimethyl-6-sulfophenylthio, 2-methyl-4-sulfamoylphenylthio, 3-methyl-4-sulfamoylphenylthio, 4-methyl-2-sulfamoylphenylthio, 2-ethyl-4-sulfamoylphenylthio, 4-ethyl-2-sulfamoylphenylthio, 4-isopropyl-2-sulfamoylphenylthio, 4-tert-butyl-2-sulfamoylphenylthio, 2,4-dimethyl-5-sulfamoylphenylthio, 2,5-dimethyl-6-sulfamoylphenoxy, 3,4-dimethyl-6-sulfamoylphenylthio, 2-methoxy-4-sulfophenylthio, 2-methoxy-5-sulfophenylthio, 3-methoxy-4-sulfophenylthio, 4-methoxy-2-sulfophenylthio, 4-methoxy-5-sulfophenylthio, 2-methoxy-4-sulfamoylphenylthio, 2-methoxy-5-sulfamoylphenylthio, 3-methoxy-4-sulfamoylphenylthio, 4-methoxy-2-sulfamoylphenylthio, and 4-methoxy-5-sulfamoylphenylthio; and the like.

Among these, phenylthio groups substituted with an unsubstituted C1-C4 alkyl group, an unsubstituted C1-C4 alkoxy group, or a sulfamoyl group are preferred; unsubstituted C1-C4 alkoxy-substituted phenylthio groups are more preferred, and an unsubstituted phenylthio group is still more preferred.

Of the substituents which may be further contained in Nc, the unsubstituted naphthylthio group is exemplified by unsubstituted naphth-1-ylthio, unsubstituted naphth-2-ylthio, and the like.

Similarly, the substituent in the substituted naphthylthio group is exemplified by a sulfo group, a sulfamoyl group, and the like. The number of the substituent is 1 or 2. Any of these groups is substituted on the naphthalene ring. Specific examples thereof include sulfo-substituted types such as 2-sulfonaphth-1-ylthio, 4-sulfonaphth-1-ylthio, 5-sulfonaphth-1-ylthio, 6-sulfonaphth-1-ylthio, 7-sulfonaphth-1-ylthio, 1-sulfonaphth-2-ylthio, 3-sulfonaphth-2-ylthio, 4-sulfonaphth-2-ylthio, 5-sulfonaphth-2-ylthio, 6-sulfonaphth-2-ylthio, 7-sulfonaphth-2-ylthio, 8-sulfonaphth-2-ylthio, 5,7-disulfonaphth-1-ylthio, 6,8-disulfonaphth-1-ylthio, 5,7-disulfonaphth-2-ylthio, and 6,8-disulfonaphth-2-ylthio; sulfamoyl-substituted types such as 2-sulfamoylnaphth-1-ylthio, 4-sulfamoylnaphth-1-ylthio, 5-sulfamoylnaphth-1-ylthio, 6-sulfamoylnaphth-1-ylthio, 7-sulfamoylnaphth-1-ylthio, 1-sulfamoylnaphth-2-ylthio, 3-sulfamoylnaphth-2-ylthio, 4-sulfamoylnaphth-2-ylthio, 5-sulfamoylnaphth-2-ylthio, 6-sulfamoylnaphth-2-ylthio, 7-sulfamoylnaphth-2-ylthio, 8-sulfamoylnaphth-2-ylthio, 5,7-disulfamoylnaphth-1-ylthio, 6,8-disulfamoylnaphth-1-ylthio, 5,7-disulfamoylnaphth-2-ylthio, and 6,8-disulfamoylnaphth-2-ylthio; types substituted with the aforementioned multiple kinds of groups such as 5-sulfamoyl-7-sulfonaphth-1-ylthio, 7-sulfamoyl-5-sulfonaphth-1-ylthio, 6-sulfamoyl-8-sulfonaphth-1-ylthio, 8-sulfamoyl-6-sulfonaphth-1-ylthio, 5-sulfamoyl-7-sulfonaphth-2-ylthio, 7-sulfamoyl-5-sulfonaphth-2-ylthio, 6-sulfamoyl-8-sulfonaphth-2-ylthio, and 8-sulfamoyl-6-sulfonaphth-2-ylthio; and the like.

Among these, naphthylthio groups substituted with a sulfamoyl group are preferred.

In the above formula (1), examples of preferable substituent which may be further contained in Nc include a chlorine atom; an amino group; a sulfo group; linear unsubstituted C1-C4 alkoxy groups; linear unsubstituted di C1-C4 alkylamino groups; phenylamino groups substituted with an unsubstituted C1-C4 alkoxy group; linear unsubstituted C1-C4 alkylthio groups; an unsubstituted phenylthio group; and the like.

Preferable specific examples include a chlorine atom, amino, sulfo, methoxy, ethoxy, n-propoxy, n-butoxy, dimethylamino, diethylamino, di-n-propylamino, di-n-butylamino, 2-methoxyphenylamino, 4-methoxyphenylamino, 2-ethoxyphenylamino, 4-ethoxyphenylamino, 4-tert-butoxyphenylamino, 2,4-dimethoxyphenylamino, 3,4,5-trimethoxyphenylamino, methylthio, ethylthio, n-propylthio, n-butylthio, phenylthio, and the like; more preferable specific examples include, sulfo, ethoxy, n-butoxy, dimethylamino, diethylamino, di-n-butylamino, 2-methoxyphenylamino, 4-methoxyphenylamino, 4-tert-butoxyphenylamino, 2,4-dimethoxyphenylamino, n-propylthio, n-butylthio, phenylthio, and the like; and still more preferable specific examples include sulfo, n-butoxy, dimethylamino, diethylamino, 2,4-dimethoxyphenylamino, n-butylthio, and the like.

Herein, for the sake of simplicity, a phrase of "Nc does not further have a substituent" means that Nc in the above formula (1) does not have a substituent other than sulfamoyl groups having a triazine ring the number of substitution therewith is represented by k, and unsubstituted sulfamoyl groups the number of substitution therewith is represented by p. In other words, when "Nc does not further have a substituent", any of the substituents of Nc other than the groups the number of substitution therewith is represented by k and p is a hydrogen atom. In the coloring matter represented by the above formula (1), it is preferred that Nc does not further have a substituent other than the groups the number of substitution therewith is represented by k and p.

The position of substitution of the substituent in Nc is explained below.

In the above formula (1), naphthalocyanine represented by "MNc" has a structure represented by the following formula (3) and numbers 1 to 24 represent position numbers. Naphthalocyanine can have one substituent each independently on each of the positions of from 1 to 24. Therefore, any of the substituted sulfamoyl groups having a triazine ring represented by the formula (4) described later the number of substitution therewith is represented by k, the unsubstituted sulfamoyl groups the number of substitution therewith is represented by p, and the aforementioned substituents which may be further contained in addition to the above two in the above formula (1) is substituted at any of the positions of from 1 to 24 in the formula (3)

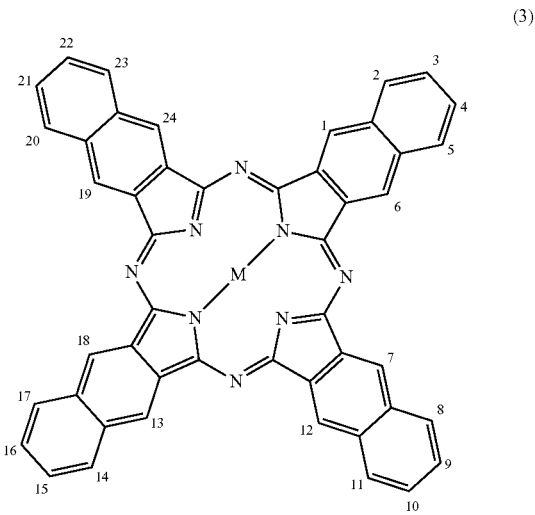

(3)

In the formula (3), M is as defined in the above formula (1).

Of the substituents which may be further contained in Nc, the halogen atom may be substituted at any of the positions of from 1 to 24. The amino group; the acetylamino group; the unsubstituted alkyl group; the substituted or unsubstituted alkoxy group; the substituted or unsubstituted phenoxy group; the substituted or unsubstituted naphthoxy group; the substituted or unsubstituted mono or dialkylamino group; the substituted or unsubstituted phenylamino group; the substituted or unsubstituted naphthylamino group; the substituted or unsubstituted benzoylamino group; the substituted or unsubstituted alkylthio group; the substituted or unsubstituted phenylthio group; the substituted or unsubstituted naphthylthio group; and the like are preferably substituted at any of the positions of 1, 6, 7, 12, 13, 18, 19, and 24 in the above formula (3). The positions of substitution of the sulfo group;

the carboxy group; the carbamoyl group; and the like are not also particularly limited, but they are preferably substituted at any of the positions of 2, 3, 4, 5, 8, 9, 10, 11, 14, 15, 16, 17, 20, 21, 22, and 23.

Moreover, the positions of substitution of the substituted sulfamoyl group having a triazine ring represented by the following formula (4) the number of substitution therewith is represented by k, and the unsubstituted sulfamoyl group the number of substitution therewith is represented by p in the above formula (1) are not also particularly limited, but these groups are preferably substituted at any positions of 2, 3, 4, 5, 8, 9, 10, 11, 14, 15, 16, 17, 20, 21, 22, and 23.

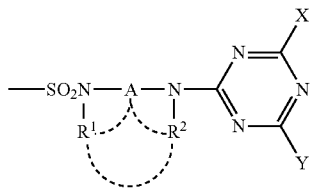

(4)

In the formula (4), A, $R^1$, $R^2$, X, and Y are similarly defined to those in the above formula (1).

In the above formula (1), M represents a hydrogen atom, a metal atom, a metal oxide, a metal hydroxide, or a metal halide.

Specific examples of the metal atom include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi, and the like.

Examples of the metal oxide include VO, GeO, and the like.

Examples of the metal hydroxide include $Si(OH)_2$, $Cr(OH)_2$, $Sn(OH)_2$, AlOH, and the like.

Examples of the metal halide include $SiCl_2$, VCl, $VCl_2$, VOCl, FeCl, GaCl, ZrCl, AlCl, and the like.

Of these, Fe, Co, Cu, Ni, Zn, Al, AlOH, AlCl, V, or VO is preferred, Co, Cu, Zn, AlOH, or VO is more preferred, and Cu or VO is still more preferred.

In the above formula (1), $R^1$ and $R^2$ each independently represent a hydrogen atom; a substituted or unsubstituted alkyl group; a substituted or unsubstituted aralkyl group; or a substituted or unsubstituted aryl group.

The unsubstituted alkyl group in the above $R^1$ and $R^2$ is similarly defined as those in connection with the unsubstituted alkyl group among the substituents which may be further contained in Nc.

The substituted alkyl group in the above $R^1$ and $R^2$ may be a substituted C1-C4 alkyl group, and preferably a substituted C2-C4 alkyl group. The substituent may be exemplified by a hydroxy group, a carboxy group, a sulfo group, and the like. Specific examples include hydroxy-substituted types such as 2-hydroxyethyl, 3-hydroxypropyl, and 4-hydroxybutyl; carboxy-substituted types such as carboxymethyl, 2-carboxyethyl, 3-carboxypropyl, and 4-carboxybutyl; sulfo-substituted types such as 2-sulfoethyl, 3-sulfopropyl, and 4-sulfobutyl; and the like.

Among these, C2-C4 alkyl groups substituted with a hydroxy group or a sulfo group are preferred, and hydroxy-substituted C2-C4 alkyl groups are more preferred.

The unsubstituted aralkyl group in the above $R^1$ and $R^2$ is exemplified by a C7-C10 aralkyl group, and a phenyl C1-C4 alkyl group, or a naphthyl C1-C2 alkyl group is preferred. Specific examples include benzyl, 1-phenylethyl, 2-phenylethyl, 3-phenylpropyl, 4-phenylbutyl, 2-methyl-2-phenylpropyl, 2-(naphth-1-yl)ethyl, (naphth-1-yl)methyl, and the like.

Similarly, the substituent in the substituted aralkyl group may be exemplified by a chlorine atom, a methyl group, a methoxy group, and the like. The number of the substituent is 1 or 2. Specific examples include chlorine atom-substituted types such as (2-chlorophenyl)methyl, (4-chlorophenyl)methyl, and (2,4-dichlorophenyl)methyl; methyl-substituted types such as (2-methylphenyl)methyl, (4-methylphenyl)methyl, (2,4-dimethylphenyl)methyl, (2,5-dimethylphenyl)methyl, (2,6-dimethylphenyl)methyl, and (3,4-dimethylphenyl)methyl; methoxy-substituted types such as (2-methoxyphenyl)methyl, and (4-methoxyphenyl)methyl; and the like.

Among these, aralkyl groups substituted with a chlorine atom, a methyl group, or a methoxy group are preferred, and methoxy-substituted aralkyl groups are more preferred.

The unsubstituted aryl group in the above $R^1$ and $R^2$ preferably has carbon atoms of from 6 to 10, and specific examples thereof include phenyl, 1-naphthyl, 2-naphthyl, and the like.

Similarly, the substituent in the substituted aryl group may be exemplified by a hydroxy group, a methoxy group, a carboxy group, a sulfo group, and the like. The number of the substituent is typically from 1 to 3, and preferably 1 or 2. Specific examples include hydroxy-substituted types such as 2-hydroxyphenyl, 4-hydroxyphenyl, 1-hydroxynaphth-2-yl, 3-hydroxynaphth-2-yl, 5-hydroxynaphth-2-yl, 2-hydroxynaphth-1-yl, 4-hydroxynaphth-1-yl, and 6-hydroxynaphth-1-yl; methoxy-substituted types such as 2-methoxyphenyl, 4-methoxyphenyl, 2,4-dimethoxyphenyl, 1-methoxynaphth-2-yl, 3-methoxynaphth-2-yl, 5-methoxynaphth-2-yl, 2-methoxynaphth-1-yl, 4-methoxynaphth-1-yl, and 6-methoxynaphth-1-yl; carboxy-substituted types such as 2-carboxyphenyl, 3-carboxyphenyl, 4-carboxyphenyl, 2,4-dicarboxyphenyl, 2,5-carboxyphenyl, and 3,5-carboxyphenyl; sulfo-substituted types such as 2-sulfophenyl, 3-sulfophenyl, 4-sulfophenyl, 2,4-disulfophenyl, 2,5-disulfophenyl, 3,5-disulfophenyl, 5-sulfonaphth-2-yl, 6-sulfonaphth-2-yl, 7-sulfonaphth-2-yl, 4-sulfonaphth-1-yl, 5-sulfonaphth-1-yl, 7-sulfonaphth-1-yl, 5,7-disulfonaphth-2-yl, and 6,8-disulfonaphth-2-yl; aryl groups substituted with the aforementioned multiple kinds of groups such as 8-hydroxy-6-sulfonaphth-2-yl, 5-hydroxy-7-sulfonaphth-2-yl, and 3,6-disulfo-8-hydroxynaphth-1-yl; and the like.

Among these, aryl groups substituted with a methoxy group, a carboxy group, or a sulfo group are preferred, and sulfo-substituted aryl groups are more preferred.

The aforementioned $R^1$ and $R^2$ are exemplified by a hydrogen atom; an unsubstituted C1-C8 alkyl group; an unsubstituted aralkyl group; an unsubstituted aryl group; and the like.

Specific examples include a hydrogen atom, methyl, ethyl, n-propyl, n-butyl, n-octyl, benzyl, 1-phenylethyl, 2-phenylethyl, 3-phenylpropyl, 2-(naphth-1-yl)ethyl, phenyl, 1-naphthyl and the like; a hydrogen atom, methyl, ethyl, n-butyl, benzyl, 2-phenylethyl, phenyl, and 1-naphthyl are preferred, and a hydrogen atom, methyl, and phenyl are more preferred. More preferably, both $R^1$ and $R^2$ are a hydrogen atom.

In the above formula (1), A represents a crosslinking group.

The crosslinking group is typically exemplified by a divalent hydrocarbon crosslinking group, and examples thereof include a substituted or unsubstituted alkylene group; a substituted or unsubstituted cycloalkylene group; a substituted or unsubstituted phenylene group; a substituted or unsubstituted naphthylene group; a substituted or unsubstituted aralkylene group, and the like. In regard to each of these groups, one being unsubstituted is more preferred than one having a substituent.

The unsubstituted alkylene group in the above A may be exemplified by linear or branched alkylene groups, and linear alkylene groups are preferred. The number of carbon atoms is typically from 2 to 20, preferably from 2 to 12, and more preferably from 2 to 6. Specific examples include ethylene, propylene, butylene, pentylene, hexylene, heptylene, octylene, nonylene, decylene, undecylene, dodecylene, tridecylene, tetradecylene, pentadecylene, hexadecylene, heptadecylene, octadecylene, nonadecylene, eicocylene, and the like.

The unsubstituted cycloalkylene group in the above A may be exemplified by cycloalkylene groups having typically from 3 to 20 carbon atoms, and preferably from 4 to 8 carbon atoms. Specific examples include cyclopropanediyl, cyclobutanediyl, cyclopentanediyl, cyclohexanediyl, cycloheptanediyl, cyclooctanediyl, cyclononanediyl, cyclodecanediyl, and the like.

The unsubstituted phenylene group in the above A may be exemplified by o-phenylene, m-phenylene, p-phenylene, and the like.

The unsubstituted naphthylene group in the above A may be exemplified by 1,4-naphthylene, 1,8-naphthylene, and the like. Similarly, the substituent in the substituted naphthylene group may be exemplified by a C1-C4 alkyl group, and specific examples thereof include 2-methyl-1,4-naphthylene, and the like.

The unsubstituted aralkylene group in the above A is preferably phenylenebis(alkylene), having carbon atoms of typically from 7 to 20, and preferably from 7 to 10.

Specific examples include o-xylylene, m-xylylene, p-xylylene, 1,2-phenylenebis(ethylene), 1,3-phenylenebis(ethylene), 1,4-phenylenebis(ethylene), and the like.

Two of $R^1$, $R^2$, and A in the above formula (1) may be joined to form a ring. Typical examples in this case include the following three Constitutions a) to c).

Constitution a)
A is a linear alkylene; $R^1$ and $R^2$ are an unsubstituted alkyl group; and $R^1$ and $R^2$ are joined to form a ring.

Constitution b)
A is a linear or branched alkylene; $R^1$ is an unsubstituted alkyl group and $R^2$ is a hydrogen atom; and A and $R^1$ are joined to form a ring.

Constitution c)
A is a linear or branched alkylene; $R^1$ is a hydrogen atom; $R^2$ is an unsubstituted alkyl group; and A and $R^2$ are joined to form a ring.

In the Constitution a), A is a linear or branched C2-C4 alkylene, preferably a linear C2-C3 alkylene, and $R^1$ and $R^2$ are an unsubstituted alkyl group, and preferably methyl. The ring formed hereby is exemplified by piperazine in combination with two nitrogen atoms bound to A in the formula (1), and specific examples thereof include one shown as No. 8 in the following Table 2, and the like.

In the Constitution b), A is preferably a linear or branched C3-C4 alkylene; $R^1$ is an unsubstituted alkyl group, and preferably methyl or ethyl; and $R^2$ is a hydrogen atom. The ring formed hereby is exemplified by 4-aminopiperidin-1-yl in combination with two nitrogen atoms bound to A in the formula (1), and specific examples thereof include one shown as No. 9 in the following Table 2, and the like.

In the Constitution c), A is preferably a linear or branched C3-C4 alkylene; $R^1$ is a hydrogen atom; and $R^2$ is an unsubstituted alkyl group, and preferably methyl or ethyl. The ring formed hereby is exemplified by 4-aminopiperidin-1-yl in combination with two nitrogen atoms bound to A in the formula (1), and specific examples thereof include one shown as No. 10 in the following Table 2, and the like.

Among these, the Constitution a) is preferred.

Preferable groups in the above A include unsubstituted C2-C6 alkylene groups; unsubstituted C4-C8 cycloalkylene groups; unsubstituted phenylene groups; unsubstituted aralkylene groups; the aforementioned Constitution a); and the like. More preferably, unsubstituted C2-C3 alkylene; unsubstituted phenylene; and unsubstituted aralkylene may be exemplified. More preferably, unsubstituted C2-C3 alkylene may be exemplified.

In the above formula (1), X and Y each independently represent a halogen atom; a hydroxy group; an amino group; a substituted or unsubstituted alkoxy group; a substituted or unsubstituted aryloxy group; a substituted or unsubstituted aralkyloxy group; a substituted or unsubstituted mono- or di-alkylamino group; a substituted or unsubstituted arylamino group; a substituted or unsubstituted aralkylamino group; a substituted or unsubstituted alkylthio group; a substituted or unsubstituted arylthio group; or a substituted or unsubstituted aralkylthio group.

The halogen atom in the above X and Y is exemplified by a fluorine atom, a chlorine atom, a bromine atom and the like, and a chlorine atom is preferred.

The substituted or unsubstituted alkoxy group in the above X and Y is defined similarly to those referred to in connection with the substituted or unsubstituted alkoxy group among the substituents which may be further contained in Nc.

The substituted or unsubstituted aryloxy group in the above X and Y is defined similarly to those referred to in connection with the substituted or unsubstituted aryloxy group among the substituents which may be further contained in Nc.

The substituted or unsubstituted aralkyloxy group in the above X and Y is defined similarly to those referred to in connection with the substituted or unsubstituted aralkyloxy group among the substituents which may be further contained in Nc.

The substituted mono or dialkylamino group in the above X and Y is defined similarly to those referred to in connection with the substituted or unsubstituted monoalkylamino group, and the substituted or unsubstituted dialkylamino group among the substituents which may be further contained in Nc.

The substituted or unsubstituted arylamino group in the above X and Y is defined similarly to those referred to in connection with the substituted or unsubstituted phenylamino group, and the substituted or unsubstituted naphthylamino group among the substituents which may be further contained in Nc.

Of both these two, the substituted or unsubstituted phenylamino groups are preferred.

The unsubstituted aralkylamino group in the above X and Y may be exemplified by phenyl C1-C6 alkylamino groups, and specific examples thereof include phenylmethylamino, phenethylamino, 3-phenylpropylamino, 4-phenylbutylamino, and the like.

Similarly, the substituent in the substituted aralkylamino group may be exemplified by a chlorine atom, a methyl group, a methoxy group, carboxy group, a sulfo group, and the like. The number of substitution of the substituents is typically from 1 to 3, and preferably 1 or 2. Specific examples thereof include chlorine atom-substituted types such as (2-chlorophenyl)methylamino, (3-chlorophenyl)methylamino, (4-chlorophenyl)methylamino, (2,4-dichlorophenyl)methylamino, (3,4-dichlorophenyl)methylamino, 2-(2-chlorophenyl)ethylamino, 2-(4-chlorophenyl)ethylamino, and 2-(2,4-dichlorophenyl)ethylamino; methyl-substituted types such as (2-methylphenyl)methylamino, (3-methylphenyl)methylamino, and (4-methylphenyl)methylamino; methoxy-substituted types such as (2-methoxyphenyl)methylamino, (3-methoxyphenyl)methylamino, (4-methoxyphenyl)methylamino, 2-(2-methoxyphenyl)ethylamino, 2-(3-methoxyphenyl)ethylamino, and 2-(4-methoxyphenyl)ethylamino; carboxy-substituted types such as (2-carboxyphenyl)methylamino, and (4-carboxyphenyl)methylamino; sulfo-substituted types such as (2-sulfophenyl)methylamino, (4-sulfophenyl)methylamino, (2,4-disulfophenyl)methylamino, 2-(2-sulfophenyl)ethylamino, 2-(4-sulfophenyl)ethylamino, 2-(2,4-disulfophenyl)ethylamino, 3-(2-sulfophenyl)propylamino, 3-(4-sulfophenyl)propylamino, 3-(2,4-disulfophenyl)propylamino, 4-(2-sulfophenyl)butylamino, 4-(4-sulfophenyl)butylamino, and 4-(2,4-disulfophenyl)butylamino; types substituted with multiple kinds of the aforementioned substituents such as (2-chloro-4-sulfophenyl)methylamino, (2-chloro-6-sulfophenyl)methylamino, (3-chloro-4-sulfophenyl)methylamino, (5-chloro-2-sulfophenyl)methylamino, (4-chloro-2-sulfophenyl)methylamino, 2-(2-chloro-4-sulfophenyl)ethylamino, 2-(2-chloro-6-sulfophenyl)ethylamino, 2-(4-chloro-2-sulfophenyl)ethylamino, (2-methyl-3-sulfophenyl)methylamino, (2-methyl-4-sulfophenyl)methylamino, (2-methyl-5-sulfophenyl)methylamino, (2-methyl-6-sulfophenyl)methylamino, (2-methyl-3,5-disulfophenyl)methylamino, (2-methyl-4,6-disulfophenyl)methylamino, (3-methyl-2-sulfophenyl)methylamino, (3-methyl-4-sulfophenyl)methylamino, (5-methyl-2-sulfophenyl)methylamino, (3-methyl-2,4-disulfophenyl)methylamino, (3-methyl-2,6-disulfophenyl)methylamino, (5-methyl-2,4-disulfophenyl)methylamino, (4-methyl-2-sulfophenyl)methylamino, (4-methyl-3-sulfophenyl)methylamino, (4-methyl-5-sulfophenyl)methylamino, (4-methyl-6-sulfophenyl)methylamino, (4-methyl-2,6-disulfophenyl)methylamino, (4-methyl-3,5-disulfophenyl)methylamino, (2-methoxy-3-sulfophenyl)methylamino, (2-methoxy-5-sulfophenyl)methylamino, (2-methoxy-3,5-disulfophenyl)methylamino, (3-methoxy-2-sulfophenyl)methylamino, (3-methoxy-4-sulfophenyl)methylamino, (5-methoxy-2-sulfophenyl)methylamino, (3-methoxy-2,6-disulfophenyl)methylamino, (5-methoxy-2,4-disulfophenyl)methylamino, (4-methoxy-3-sulfophenyl)methylamino, (4-methoxy-3,5-disulfophenyl)methylamino, 2-(2-methoxy-3-sulfophenyl)ethylamino, 2-(2-methoxy-5-sulfophenyl)ethylamino, 2-(2-methyl-3,5-disulfophenyl)ethylamino, 2-(3-methoxy-2-sulfophenyl)ethylamino, 2-(3-methoxy-4-sulfophenyl)ethylamino, 2-(5-methoxy-2-sulfophenyl)ethylamino, 2-(3-methoxy-2,6-disulfophenyl)ethylamino, 2-(5-methoxy-2,4-disulfophenyl)ethylamino, 2-(4-methoxy-3-sulfophenyl)ethylamino, and 2-(4-methoxy-3,5-disulfophenyl)ethylamino; and the like.

Among these, aralkylamino groups substituted with a methoxy group or a sulfo group, or a chlorine atom are preferred, and sulfo-substituted aralkylamino groups are more preferred.

The substituted or unsubstituted alkylthio group in the above X and Y is defined similarly to those referred to in connection with the substituted or unsubstituted alkylthio group among the substituents which may be further contained in Nc.

The substituted or unsubstituted arylthio group in the above X and Y is defined similarly to those referred to in connection with the substituted or unsubstituted phenylthio group, and the substituted or unsubstituted naphthylthio group among the substituents which may be further contained in Nc.

The unsubstituted aralkylthio group in the above X and Y may be exemplified by phenyl C1-C6 alkylthio groups, and specific examples thereof include phenylmethylthio, phenethylthio, 3-phenylpropylthio, 4-phenylbutylthio, and the like.

Similarly, the substituent of the substituted aralkylthio group may be exemplified by a chlorine atom, a methyl group, a methoxy group, and the like. The number of the substituent is typically from 1 to 3, and preferably 1 or 2. Specific examples thereof include chlorine atom-substituted types such as (2-chlorophenyl)methylthio, (4-chlorophenyl)methylthio, and (2,4-dichlorophenyl)methylthio; methyl-substituted types such as (2-methylphenyl)methylthio, and (4-methylphenyl)methylthio; methoxy-substituted types such as (2-methoxyphenyl)methylthio, and (4-methoxyphenyl)methylthio; and the like.

Among these, aralkylthio groups substituted with a chlorine atom or a methoxy group are preferred, and chlorine atom-substituted aralkylthio groups are more preferred.

In the above formula (1), examples of the substituent in X and Y include a hydroxy group; an amino group; a phenoxy group having a benzene ring substituted with a sulfo group or carboxy group; a naphthoxy group having a naphthalene ring substituted with a sulfo group; a mono C2-C4 alkylamino group substituted with a hydroxy group, a sulfo group, or a carboxy group; a phenylamino group having a benzene ring substituted with a sulfo group or a carboxy group; a naphthylamino group having a naphthalene ring substituted with a sulfo group; a benzylamino group having a benzene ring substituted with a sulfo group; a phenethylamino group having a benzene ring substituted with a sulfo group; a C2-C4 alkylthio group substituted with a sulfo group or a carboxy group; and the like.

The substituent is more preferably a phenylamino group having a benzene ring substituted with a sulfo group or a carboxy group, and more preferably a phenylamino group having a benzene ring substituted with a sulfo group.

In the above formula (1), k that represents the number of substitution with the substituted sulfamoyl group having a triazine ring represented by the above formula (4) is greater than 0, and no greater than 12. As k increases, the solubility tends to be improved, but the water resistance tends to be deteriorated; therefore, the value of k may be regulated appropriately while taking into consideration the solubility and water resistance. The value of k is typically greater than 0 and no greater than 12, more preferably no less than 0.1 and no greater than 8, and still more preferably no less than 0.1 and no greater than 4.

In the above formula (1), p that represents the number of substitution with the unsubstituted sulfamoyl is typically no less than 0 and less than 12, preferably no less than 4 and less than 11.9, and more preferably no less than 8 and less than 11.9.

In addition, the sum total of k and p is, taking into consideration the water resistance as described above, greater than 0 and no greater than 12, and more preferably no less than 0.1 and no greater than 12.

It is to be noted that since the coloring matter represented by the formula (1) of the present invention is a mixture as described above, k and p are both a mean value.

The coloring matter represented by the above formula (2) is a preferable coloring matter represented by the above formula (1).

In the above formula (2), Nc, M, k, and p are similarly defined as those in the formula (1).

D and E each independently represent a chlorine atom; a hydroxy group; an amino group; an alkoxy group unsubstituted, or substituted with a hydroxy group, a sulfo group or a carboxy group; a phenoxy group unsubstituted, or having a benzene ring substituted with one or at least two substituents selected from the group consisting of a chlorine atom, an alkyl group, an alkoxy group, a sulfo group, and a carboxy group; a naphthoxy group unsubstituted, or having a naphthalene ring substituted with one or at least two substituents selected from the group consisting of an acetylamino group and a sulfo group; a benzyloxy group unsubstituted, or having a benzene ring substituted with a sulfo group; a phenethyloxy group unsubstituted, or having a benzene ring substituted with a sulfo group; a mono- or di-alkylamino group unsubstituted, or substituted with a hydroxy group, an unsubstituted C1-C4 alkoxy group, a sulfo group or a carboxy group; a phenylamino group unsubstituted, or having a benzene ring substituted with one or at least two substituents selected from the group consisting of a chlorine atom, an unsubstituted C1-C4 alkyl group, an unsubstituted C1-C4 alkoxy group, a sulfo group, and a carboxy group; a naphthylamino group unsubstituted, or having a naphthalene ring substituted with a sulfo group; a benzylamino group unsubstituted, or having a benzene ring substituted with a sulfo group; a phenethylamino group unsubstituted, or having a benzene ring substituted with a sulfo group; an alkylthio group unsubstituted, or substituted with a hydroxy group, a sulfo group or a carboxy group; a phenylthio group unsubstituted, or having a benzene ring substituted with one or at least two substituents selected from the group consisting of an unsubstituted C1-C4 alkyl group, an unsubstituted C1-C4 alkoxy group, a sulfo group, and a carboxy group; or a naphthylthio group unsubstituted, or having a naphthalene ring substituted with a sulfo group.

In the above formula (2), B represents an alkylene group; a phenylene group; or a xylylene group. These are similarly defined to correspond to those described in connection with the substituted or unsubstituted alkylene group, the substituted or unsubstituted phenylene group, and the substituted or unsubstituted aralkylene group in the aforementioned A. Ethylene, propylene, butylene, pentylene, hexylene, p-phenylene, or p-xylylene is preferred, and ethylene or propylene is more preferred.

The unsubstituted alkoxy group in the above D and E is similarly defined to those described in connection with the unsubstituted alkoxy group in the substituent which may be further contained in Nc.

The alkoxy group substituted with a hydroxy group, a sulfo group, or a carboxy group in the above D and E is similarly defined to correspond to those described in connection with the substituted alkoxy group among the substituents which may be further contained in Nc.

The phenoxy group having a benzene ring substituted with one or at least two substituents selected from the group consisting of a chlorine atom, an alkyl group, an alkoxy group, a sulfo group, and a carboxy group in the above D and E is similarly defined to correspond to those described in connection with the substituted phenoxy group among the substituents which may be further contained in Nc.

The unsubstituted naphthoxy group in the above D and E is exemplified by unsubstituted naphth-1-yloxy, unsubstituted naphth-2-yloxy, and the like.

Examples of the naphthoxy group having a naphthalene ring substituted with one or at least two substituents selected from the group consisting of an acetylamino group and a sulfo group in the above D and E include acetylamino-substituted naphthoxy groups such as 2-acetylaminonaphth-1-yloxy, 4-acetylaminonaphth-1-yloxy, 5-acetylaminonaphth-1-yloxy, 6-acetylaminonaphth-1-yloxy, 1-acetylaminonaphth-2-yloxy, 3-acetylaminonaphth-2-yloxy, 6-acetylaminonaphth-2-yloxy, and 8-acetylaminonaphth-2-yloxy; sulfo-substituted naphthoxy groups such as 3-sulfonaphth-1-yloxy, 4-sulfonaphth-1-yloxy, 5-sulfonaphth-1-yloxy, 8-sulfonaphth-1-yloxy, 6-sulfonaphth-2-yloxy, 7-sulfonaphth-2-yloxy, 8-sulfonaphth-2-yloxy, 3,6-disulfonaphth-1-yloxy, and 6,8-disulfonaphth-2-yloxy; naphthoxy groups substituted with the aforementioned multiple kinds of groups such as acetyl 6-amino-3-sulfonaphth-1-yloxy, 7-acetylamino-3-sulfonaphth-1-yloxy, 6-acetylamino-3,5-disulfonaphth-1-yloxy, 7-acetylamino-3,6-disulfonaphth-1-yloxy, 8-acetylamino-3,5-disulfonaphth-1-yloxy, and 8-acetylamino-3,6-disulfonaphth-1-yloxy; and the like. The number of the substituent is typically from 1 to 3, and preferably 1 or 2.

Sulfo-substituted naphthoxy groups are preferred.

In the case of the benzyloxy group having a benzene ring substituted with a sulfo group in the above D and E, specific examples thereof include mono- or di-substituted types with a sulfo group such as (2-sulfophenyl)methoxy, (4-sulfophenyl)methoxy, and (2,4-disulfophenyl)methoxy.

Examples of the phenethyloxy group having a benzene ring substituted with a sulfo group in the above D and E include mono- or di-substituted types with a sulfo group such as 2-(2-sulfophenyl)ethoxy, 2-(4-sulfophenyl)ethoxy, and 2-(2,4-disulfophenyl)ethoxy.

The unsubstituted mono or dialkylamino group in the above D and E is similarly defined to correspond to those described in connection with the unsubstituted mono- or di-alkylamino group among the substituents which may be further contained in Nc.

In the above formula (2), the mono- or di-alkylamino group substituted with a hydroxy group, a sulfo group, or a carboxy group for the D and E is similarly defined to correspond to those described in connection with the substituted mono or dialkylamino group among the substituents which may be further contained in Nc.

The phenylamino group having a benzene ring substituted with one or at least two substituents selected from the group consisting of a chlorine atom, an unsubstituted C1-C4 alkyl group, an unsubstituted C1-C4 alkoxy group, a sulfo group and a carboxy group in the above D and E is similarly defined to correspond to those described in connection with the substituted phenylamino group among the substituents which may be further contained in Nc.

Specific examples of the unsubstituted naphthylamino group in the above D and E include unsubstituted naphth-1-ylamino and unsubstituted naphth-2-ylamino.

The naphthylamino group having a naphthalene ring substituted with a sulfo group in the above D and E is similarly defined to correspond to those described in connection with the substituted naphthylamino group among the substituents which may be further contained in Nc.

Examples of the benzylamino group having a benzene ring substituted with a sulfo group in the above D and E include mono- or di-substituted types with a sulfo group such as (2-sulfophenyl)methylamino, (4-sulfophenyl)methylamino, and (2,4-disulfophenyl)methylamino.

Examples of the phenethylamino group having a benzene ring substituted with a sulfo group in the above D and E include mono- or di-substituted types with a sulfo group such as 2-(2-sulfophenyl)ethylamino, 2-(4-sulfophenyl)ethylamino, and 2-(2,4-disulfophenyl)ethylamino.

The unsubstituted alkylthio group in the above D and E is similarly defined to correspond to those described in connection with the unsubstituted alkylthio group among the substituents which may be further contained in Nc.

The alkylthio group substituted with a hydroxy group, a sulfo group, or a carboxy group in the above D and E is similarly defined to correspond to those described in connection with the substituted alkylthio group of the substituents which may be further contained in Nc.

The phenylthio group having a benzene ring substituted with one or at least two substituents selected from the group consisting of an unsubstituted C1-C4 alkyl group, an unsubstituted C1-C4 alkoxy group, a sulfo group, and a carboxy group in the above D and E is similarly defined to correspond to those described in connection with the substituted phenylthio group among the substituents which may be further contained in Nc.

The naphthylthio group having a naphthalene ring substituted with a sulfo group in the above D and E is similarly defined to correspond to those described in connection with the substituted naphthylthio group among the substituents which may be further contained in Nc.

Preferable substituent in the above D and E may be exemplified by a mono- or di-C1-C4 alkylamino group unsubstituted, or substituted with a hydroxy group, an unsubstituted C1-C4 alkoxy group, a sulfo group or a carboxy group; a phenylamino group unsubstituted, or having a benzene ring substituted with one or at least two substituents selected from the group consisting of an unsubstituted C1-C4 alkyl group, an unsubstituted C1-C4 alkoxy group, a sulfo group, and a carboxy group; a naphthylamino group unsubstituted, or having a naphthalene ring substituted with a sulfo group; a benzylamino group unsubstituted, or having a benzene ring substituted with a sulfo group; or a phenethylamino group unsubstituted, or having a benzene ring substituted with a sulfo group. A hydroxy group; an amino group; a phenylamino group unsubstituted, or substituted with at least one, preferably one or two carboxy group(s) or sulfo group(s); or a mono C2-C4 alkylamino group unsubstituted, or substituted with at least one, preferably one or two, and more preferably one carboxy group or sulfo group is more preferred. An amino group; a phenylamino group substituted with one or two carboxy groups or sulfo groups; or a mono C2-C4 alkylamino group substituted with one carboxy group or sulfo group is still more preferred.

Preferable combinations in the above D and E include the combinations of (i) and (ii) described below. Of these, the combination (ii) is more preferred.

(i)
Combination in which both D and E are a phenylamino group substituted with one or two, preferably one sulfo group.
(ii)
Combination in which D is a phenylamino group substituted with one or two sulfo group(s), or a phenylamino group substituted with one carboxy group (preferably a phenylamino group substituted with two sulfo groups), and E is an amino group, a phenylamino group substituted with one or two carboxy groups, or a mono C2-C4 alkylamino group substituted with one sulfo group (preferably an amino group).

In the coloring matter represented by the above formulae (1) and (2), combinations of preferable options of the aforementioned M, Nc, $R^1$, $R^2$, A, X, Y, D, E, k and p, and the ring formed by joining any two among $R^1$, $R^2$, and A are more preferred, and combinations of more preferable options thereof are still more preferred. In addition, those in which still more preferable options are combined are similarly even more preferred.

The coloring matter represented by the above formula (1) can achieve the effect of the present invention such as sufficient storage stability and the like in both states in which the acidic functional group such as a sulfo group or a carboxy group is in the form of a free acid and a salt. The salt of the coloring matter is that of an inorganic or organic cation. Of these, specific examples of the inorganic salt include alkali metal salts, alkaline earth metal salts and ammonium salts, and preferable inorganic salts include salts with lithium, sodium, or potassium, and ammonium salts. Alternatively, the salt of an organic cation is exemplified by salts of a quaternary ammonium ion represented by the following formula (102), but not limited thereto. Also, the free acid and various types of salts may be a mixture. Any combination may be used such as, for example, a mixture of a sodium salt and an ammonium salt, a mixture of a free acid and a sodium salt, a mixture of a lithium salt, a sodium salt and an ammonium salt, and the like. Physical property values such as solubility may vary depending on the type of the salt, and a mixture having physical properties to meet the needs can be obtained by appropriately selecting the type of the salt as needed, or changing the proportion of salts and the like when multiple types of the salts are included.

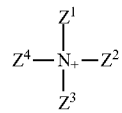

(102)

In the formula (102), $Z^1$, $Z^2$, $Z^3$, and $Z^4$ each independently represent a group selected from the group consisting of a hydrogen atom, an alkyl group, a hydroxyalkyl group, and a hydroxyalkoxyalkyl group.

Specific examples of the alkyl group for $Z^1$, $Z^2$, $Z^3$, and $Z^4$ in the formula (102) include methyl, ethyl, n-propyl, isopropyl, n-butyl, isobutyl, sec-butyl, tert-butyl, and the like. Specific examples of the hydroxyalkyl group include hydroxy C1-C4 alkyl groups such as hydroxymethyl, hydroxyethyl, 3-hydroxypropyl, 2-hydroxypropyl, 4-hydroxybutyl, 3-hydroxybutyl, and 2-hydroxybutyl. Examples of the hydroxyalkoxyalkyl group include hydroxy C1-C4 alkoxy C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl and 2-hydroxyethoxybutyl, and hydroxyethoxy C1-C4 alkyl is preferred of these. Particularly preferable examples include a hydrogen atom; methyl; hydroxy C1-C4 alkyl groups such as hydroxymethyl, hydroxyethyl, 3-hydroxypropyl, 2-hydroxypropyl, 4-hydroxybutyl, 3-hydroxybutyl, and 2-hydroxybutyl; and hydroxyethoxy C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, and 2-hydroxyethoxybutyl.

Specific examples of the combinations of $Z^1$, $Z^2$, $Z^3$, and $Z^4$ in the compound preferred for the formula (102) are shown in the following Table 1.

TABLE 1

| Compound No. | Z1 | Z2 | Z3 | Z4 |
|---|---|---|---|---|
| 1-1 | H | CH3 | CH3 | CH3 |
| 1-2 | CH3 | CH3 | CH3 | CH3 |
| 1-3 | H | —C2H4OH | —C2H4OH | —C2H4OH |
| 1-4 | CH3 | —C2H4OH | —C2H4OH | —C2H4OH |

TABLE 1-continued

| Compound No. | Z1 | Z2 | Z3 | Z4 |
|---|---|---|---|---|
| 1-5 | H | —CH2CH(OH)CH3 | —CH2CH(OH)CH3 | —CH2CH(OH)CH3 |
| 1-6 | CH3 | —CH2CH(OH)CH3 | —CH2CH(OH)CH3 | —CH2CH(OH)CH3 |
| 1-7 | H | —C2H4OH | H | —C2H4OH |
| 1-8 | CH3 | —C2H4OH | H | —C2H4OH |
| 1-9 | H | —CH2CH(OH)CH3 | H | —CH2CH(OH)CH3 |
| 1-10 | CH3 | —CH2CH(OH)CH3 | H | —CH2CH(OH)CH3 |
| 1-11 | CH3 | —C2H4OH | CH3 | —C2H4OH |
| 1-12 | CH3 | —CH2CH(OH)CH3 | CH3 | —CH2CH(OH)CH3 |

Specific examples of the water-soluble and near-infrared absorbing coloring matter represented by the above formula (1) of the present invention are shown in the following Tables 2 to 5, but the coloring matter of the present invention is not limited to the examples described below. In the case that Nc does not have any substituent other than the substituted sulfamoyl group having a triazine ring represented by the following formula (4) the number of substitution therewith is represented by k, and the unsubstituted sulfamoyl group the number of substitution therewith is represented by p in the above formula (1), it is referred to as "Unsubstituted" in the column of "Substituent of Nc". When specific examples are presented in the column of the "Substituent of Nc", the specific examples correspond to the "Substituent which may be further contained in Nc".

In addition, the position of substitution of each substituent corresponds to any of positions from 1 to 24 in the above formula (3). Further, the acidic functional group such as a sulfo group or a carboxy group is described in the form of its free acid for the sake of simplicity.

TABLE 2

| No. | M | Substituent which may be further contained in Nc | Group represented by the formula (4) |
|---|---|---|---|
| 1 | VO | Unsubstituted | 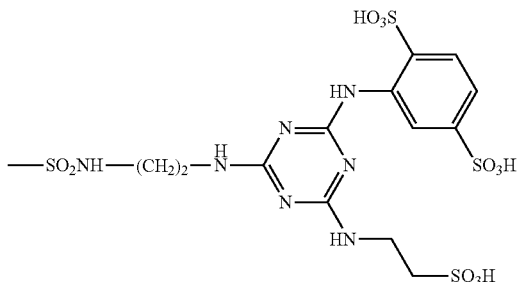 |
| 2 | VO | Unsubstituted | 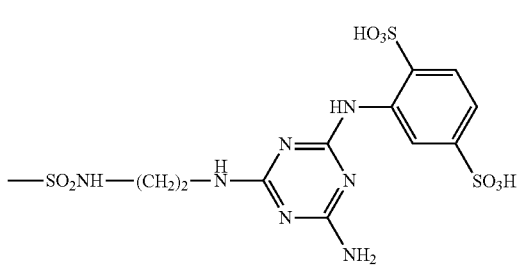 |
| 3 | VO | Unsubstituted | 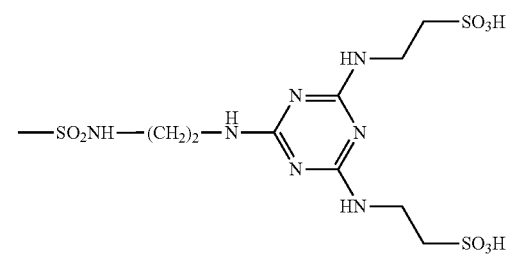 |

TABLE 2-continued
| No. | M | Substituent which may be further contained in Nc | Group represented by the formula (4) |
|---|---|---|---|
| 4 | VO | Unsubstituted | 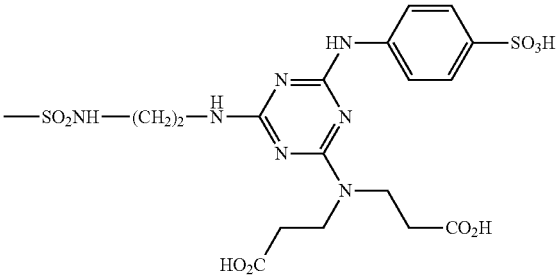 |
| 5 | VO | Unsubstituted | 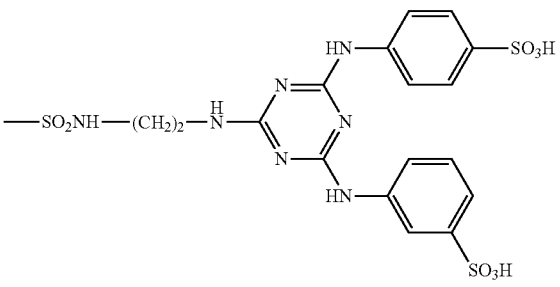 |
| 6 | VO | Unsubstituted | 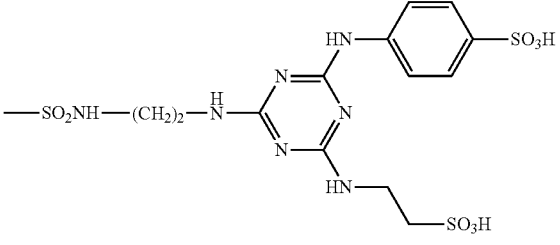 |
| 7 | VO | Unsubstituted | 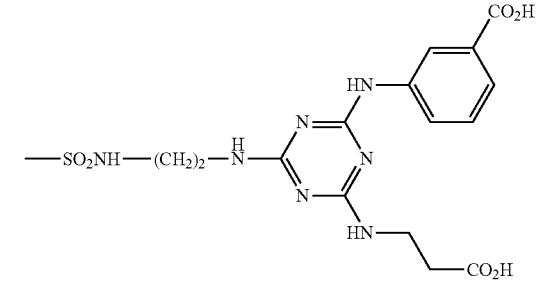 |
| 8 | VO | Unsubstituted | 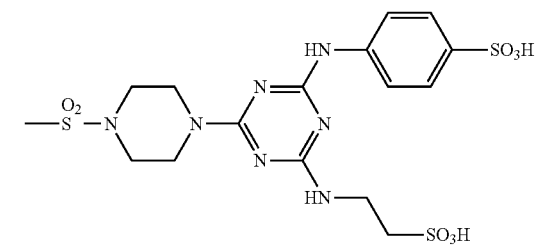 [SMILES: CS(=O)(=O)N1CCN(c2nc(NCCS(=O)(=O)O)nc(Nc3ccc(S(=O)(=O)O)cc3)n2)CC1] |

TABLE 2-continued

| No. | M | Substituent which may be further contained in Nc | Group represented by the formula (4) |
|---|---|---|---|
| 9 | VO | Unsubstituted | (structure: —S(O₂)—N-piperidinyl—NH—triazine with HN-C₆H₄-SO₃H and HN-CH₂CH₂-SO₃H substituents) |
| 10 | VO | Unsubstituted | (structure: —S(O₂)—NH—piperidinyl—triazine with HN-C₆H₄-SO₃H and HN-CH₂CH₂-SO₃H substituents) |
| 11 | VO | Unsubstituted | (structure: —S(O₂)—NH—C₆H₄—NH—triazine with HN-C₆H₄-SO₃H and HN-CH₂CH₂-SO₃H substituents) |
| 12 | VO | Unsubstituted | (structure: —S(O₂)—NH—CH₂—C₆H₄—CH₂—NH—triazine with HN-C₆H₄-SO₃H and HN-CH₂CH₂-SO₃H substituents) |

45

TABLE 3

| No. | M | Substituent which may be further contained in Nc | Goup represented by the formula (4) |
|---|---|---|---|
| 1 | Cu | Unsubstituted | —SO₂NH—(CH₂)₂—NH—triazine with HN-C₆H₃(SO₃H)₂ (2,5-disulfo) and HN-CH₂CH₂-SO₃H substituents |

TABLE 3-continued
| No. | M | Substituent which may be further contained in Nc | Group represented by the formula (4) |
|---|---|---|---|
| 2 | Cu | Unsubstituted | 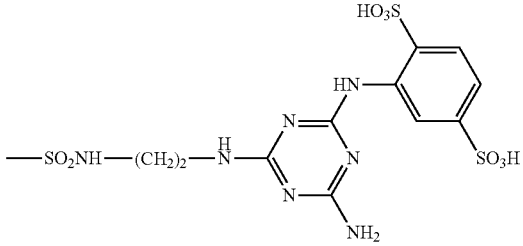 |
| 3 | Cu | Unsubstituted | 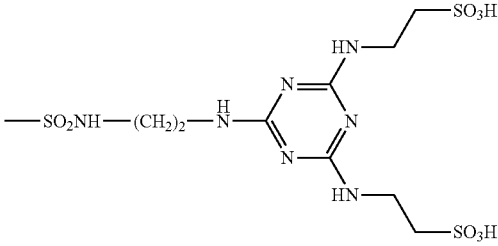 |
| 4 | Cu | Unsubstituted | 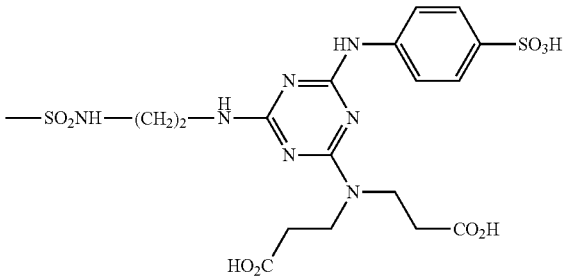 |
| 5 | Cu | Unsubstituted | 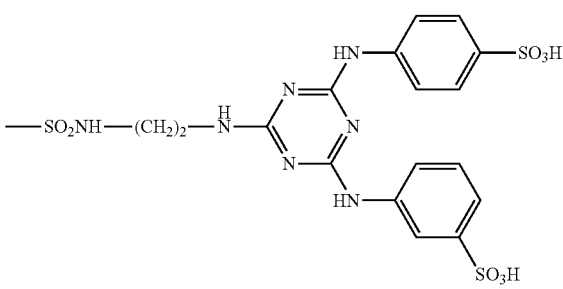 |
| 6 | Cu | Unsubstituted | 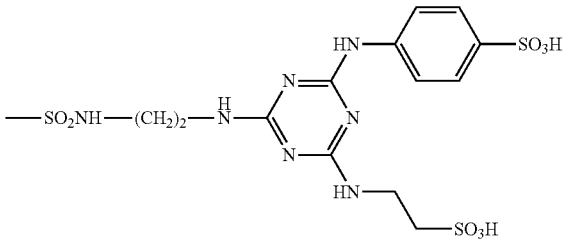 |

TABLE 3-continued
| No. | M | Substituent which may be further contained in Nc | Group represented by the formula (4) |
|---|---|---|---|
| 7 | Cu | Unsubstituted | 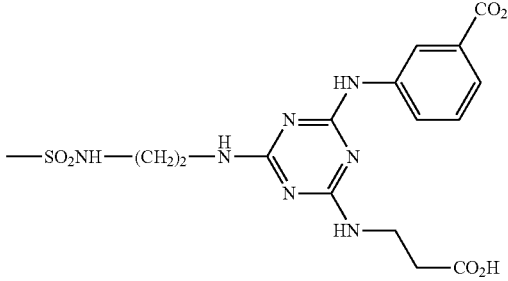 |
| 8 | Cu | Unsubstituted | 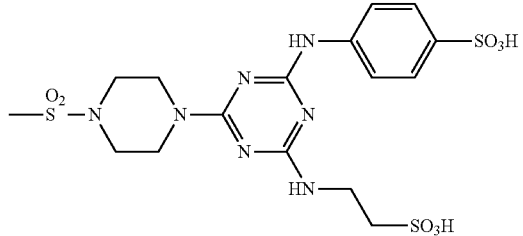 [SMILES: CS(=O)(=O)N1CCN(c2nc(NCCS(=O)(=O)O)nc(Nc3ccc(S(=O)(=O)O)cc3)n2)CC1] |
| 9 | Cu | Unsubstituted | 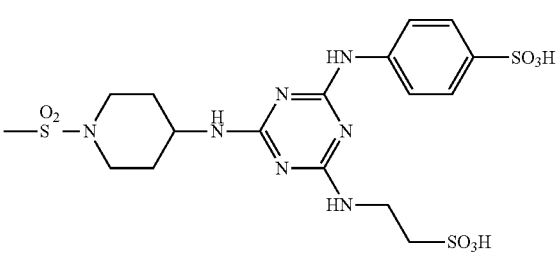 [SMILES: CS(=O)(=O)N1CCC(Nc2nc(NCCS(=O)(=O)O)nc(Nc3ccc(S(=O)(=O)O)cc3)n2)CC1] |
| 10 | Cu | Unsubstituted | 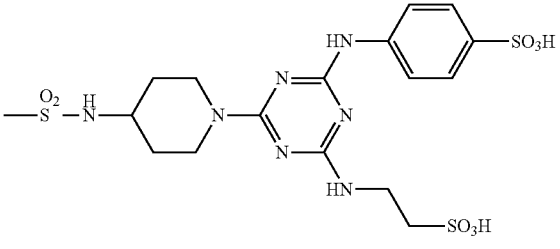 [SMILES: CS(=O)(=O)NC1CCN(c2nc(NCCS(=O)(=O)O)nc(Nc3ccc(S(=O)(=O)O)cc3)n2)CC1] |
| 11 | Cu | Unsubstituted | 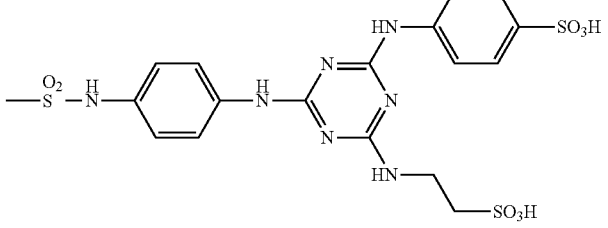 |
| 12 | Cu | Unsubstituted | 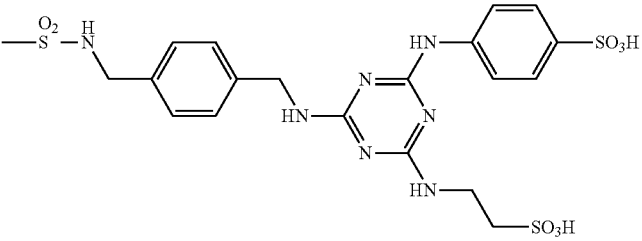 [SMILES: CS(=O)(=O)NCc1ccc(CNc2nc(NCCS(=O)(=O)O)nc(Nc3ccc(S(=O)(=O)O)cc3)n2)cc1] |

TABLE 4

| No. | M | Substituent which may be further contained in Nc | Group represented by formula (4) |
|---|---|---|---|
| 1 | Cu | 1,6,7,12,13,18,19,24-octabutoxy | —SO$_2$NH—(CH$_2$)$_2$—NH—[triazine]—NH—C$_6$H$_3$(SO$_3$H)(SO$_3$H) ; —NH—CH$_2$CH$_2$—SO$_3$H |
| 2 | Cu | 1,6,7,12,13,18,19,24-octabutoxy | —SO$_2$NH—(CH$_2$)$_2$—NH—[triazine]—NH—C$_6$H$_4$—SO$_3$H ; —NH—C$_6$H$_4$—SO$_3$H |
| 3 | Cu | 1,6,7,12,13,18,19,24-octabutoxy | —SO$_2$—NH—C$_6$H$_4$—NH—[triazine]—NH—C$_6$H$_4$—SO$_3$H ; —NH—CH$_2$CH$_2$—SO$_3$H |
| 4 | Cu | 1,6,7,12,13,18,19,24-octabutoxy | —SO$_2$NH—(CH$_2$)$_2$—NH—[triazine]—NH—C$_6$H$_3$(SO$_3$H)(SO$_3$H) ; —NH$_2$ |
| 5 | Cu | 1,6,7,12,13,18,19,24-octapentyloxy | —SO$_2$NH—(CH$_2$)$_2$—NH—[triazine]—NH—C$_6$H$_4$—SO$_3$H ; —NH—CH$_2$CH$_2$—SO$_3$H |
| 6 | Cu | 1,6,7,12,13,18,19,24-octa(2-hydroxyethoxy) | —SO$_2$NH—(CH$_2$)$_2$—NH—[triazine]—NH—C$_6$H$_4$—SO$_3$H ; —NH—CH$_2$CH$_2$—SO$_3$H |

TABLE 4-continued

| No. | M | Substituent which may be further contained in Nc | Group represented by formula (4) |
|---|---|---|---|
| 7 | Cu | 1,6,7,12,13,18,19,24-octa(3-carboxypropoxy) | —SO$_2$NH—(CH$_2$)$_2$—NH—(triazine with HN-C$_6$H$_4$-SO$_3$H and HN-CH$_2$CH$_2$-SO$_3$H substituents) |
| 8 | Cu | 1,6,7,12,13,18,19,24-octa(3-sulfopropoxy) | —SO$_2$NH—(CH$_2$)$_2$—NH—(triazine with HN-C$_6$H$_4$-SO$_3$H and HN-CH$_2$CH$_2$-SO$_3$H substituents) |
| 9 | Cu | 1,6,7,12,13,18,19,24-octakis(dibutylamino) | —SO$_2$NH—(CH$_2$)$_2$—NH—(triazine with HN-C$_6$H$_4$-SO$_3$H and HN-CH$_2$CH$_2$-SO$_3$H substituents) |
| 10 | Cu | 1,6,7,12,13,18,19,24-octabutylthio | —SO$_2$NH—(CH$_2$)$_2$—NH—(triazine with HN-C$_6$H$_4$-SO$_3$H and HN-CH$_2$CH$_2$-SO$_3$H substituents) |

TABLE 5

| No. | M | Substituent which may be further contained in Nc | Group represented by the formula (4) |
|---|---|---|---|
| 11 | VO | Unsubstituted | —SO$_2$NH—(CH$_2$)$_2$—NH—(triazine with OH and HN-C$_6$H$_3$(SO$_3$H)(SO$_3$H) substituents) |

TABLE 5-continued
| No. | M | Substituent which may be further contained in Nc | Group represented by the formula (4) |
|---|---|---|---|
| 12 | VO | Unsubstituted | 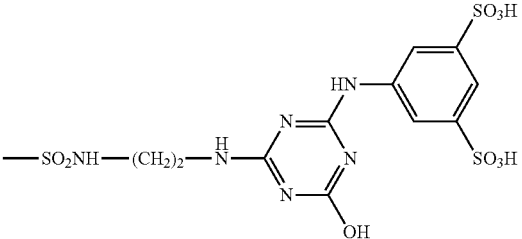 |
| 13 | VO | Unsubstituted | 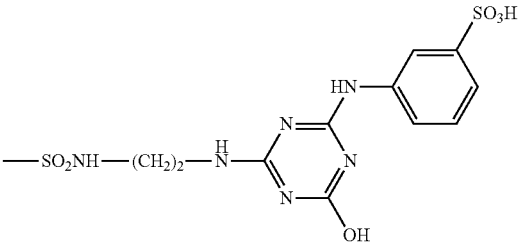 |
| 14 | VO | Unsubstituted | 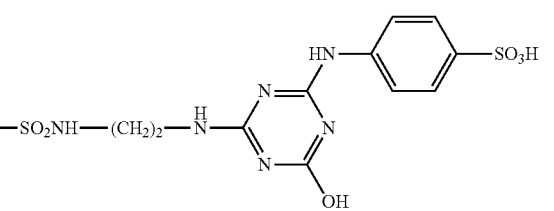 |
| 15 | VO | Unsubstituted | 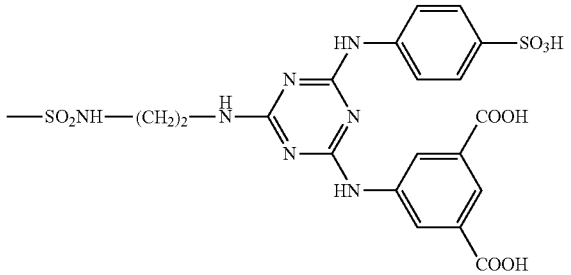 |
| 16 | VO | Unsubstituted | 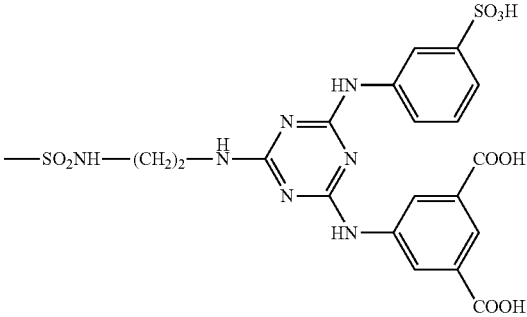 |

TABLE 5-continued

| No. | M | Substituent which may be further contained in Nc | Group represented by the formula (4) |
|---|---|---|---|
| 17 | VO | Unsubstituted | —SO$_2$NH—(CH$_2$)$_2$—NH—(triazine with HN–C$_6$H$_3$(SO$_3$H)$_2$ and HN–C$_6$H$_3$(COOH)$_2$) |
| 18 | VO | Unsubstituted | —SO$_2$NH—(CH$_2$)$_2$—NH—(triazine with HN–C$_6$H$_3$(SO$_3$H)(SO$_3$H) and HN–C$_6$H$_3$(COOH)$_2$) |

A method for producing the water-soluble and near-infrared absorbing coloring matter represented by the above formula (1) of the present invention is described in the following. The coloring matter represented by the above formula (1) of the present invention can be obtained by allowing the compound represented by the above formula (101), and the compound represented by the above formula (7) to react in the presence of a source of ammonia. The compound represented by the formula (101) is a mixture as is also clear from n that represents the number of chlorosulfonyl groups is a mean value. The compound represented by the formula (101) may be obtained by introducing a chlorosulfonyl group into a naphthalocyanine compound represented by the following formula (6) by means of chlorosulfonic acid and a chlorinating agent such as, for example, thionyl chloride, sulfuryl chloride, phosphorus trichloride, phosphorus pentachloride, phosphorous oxychloride, etc. The coloring matter represented by the formula (1) may be obtained by allowing the resulting compound represented by the formula (101), and the compound represented by the above formula (7) to react in the presence of a source of ammonia (for example, an ammonium salt such as ammonium chloride or ammonium sulfate, urea, aqueous ammonia, an ammonia gas or the like, and preferably aqueous ammonia), preferably in water.

It is to be noted that the compounds represented by the formulae (6) and (7) can be synthesized by a well-known method, and the compound represented by the formula (6) may be purchased as a commercially available product.

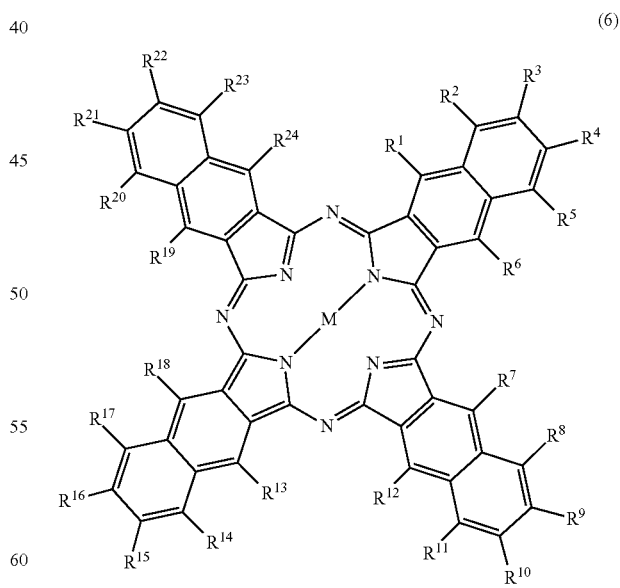

(6)

In the formula (6), M is as defined in connection with the above formula (1), and $R^1$ to $R^{24}$ represent a substituent which may be further contained in Nc, or a hydrogen atom; however, the number of the substituent which may be further contained in Nc is no less than 0 and no greater than 8 in terms of the mean value.-

When a chlorosulfonyl group is introduced into the compound represented by the above formula (6), chlorosulfonic acid, which also serves as a solvent, is used at a mass ratio of 4 to 20 times, and preferably 6 to 8 times relative to the compound of the formula (6). The reaction is allowed at a reaction temperature of 50 to 120° C., and preferably 60 to 80° C., for a reaction time of 1 to 8 hrs, and preferably 3 to 5 hrs to introduce a chlorosulfonyl group into the compound of the formula (6).

In the step of introducing a chlorosulfonyl group, a side reaction occurs in which a part of groups is hydrolyzed to be converted into a sulfo group. Therefore, it is desired that a chlorination reaction is allowed further using a chlorinating agent for converting the sulfo group into a chlorosulfonyl group. The chlorinating agent is exemplified by thionyl chloride, sulfuryl chloride, phosphorus trichloride, phosphorus pentachloride, phosphorous oxychloride, and the like.

The amount of the chlorinating agent is 10 to 30 times, and preferably 15 to 20 times at a molar ratio relative to the compound of the formula (6). The reaction temperature may be 60 to 120° C. and preferably 70 to 90° C., and the reaction time is 1 to 10 hrs and preferably 3 to 5 hrs. It is to be noted that the chlorination reaction does not necessitate operations such as isolation and purification, in particular, and the reaction may be allowed by directly adding the chlorinating agent to a reaction liquid of the chlorosulfonylation reaction.

The reaction liquid containing the compound represented by the formula (101) obtained as described above is poured into ice water at a mass ratio of 5 to 20 times relative to the chlorosulfonic acid used in the chlorosulfonylation reaction. Thus, filtration to separate the precipitated solid affords a wet cake of the compound represented by the formula (101).

This wet cake, and the compound represented by the above formula (7) in an amount of 1 to 8 times and preferably 1 to 3 times by molar ratio relative to the compound represented by the formula (6) used as a source material for the synthesis of the compound represented by the formula (101) are allowed to react in the presence of a source of ammonia. Accordingly, the coloring matter represented by the above formula (1) of the present invention can be obtained. The source of ammonia is used for the purpose of adjusting the pH of the reaction liquid, and for example, the pH may be adjusted to 8.0 to 10.0, and preferably 9.0 to 9.5 with aqueous ammonia or the like. Also, this reaction is carried out at a reaction temperature of 10 to 80° C., and preferably 50 to 60° C.

Furthermore, the coloring matter represented by the above formula (1) of the present invention is synthesized from the compound represented by the above formula (101) and the compound represented by the formula (7) under reaction conditions not particularly necessitating an anhydrous condition. Thus, it is theoretically considered that a compound is generated as a by-product in which the chlorosulfonyl group in the formula (101) is hydrolyzed in part by water contaminated in the reaction system to be converted into a sulfonic acid, and as a result, the by-product is contaminated in the intended coloring matter represented by the formula (1).

However, to distinguish an unsubstituted sulfamoyl group with a sulfo group by analyses of the coloring matter of the present invention is difficult. Accordingly, in the present invention, the chlorosulfonyl group in the formula (1) other than those reacted with the organic amine represented by the formula (7) is described with an assumption that all such groups were converted into unsubstituted sulfamoyl groups.

Thus obtained coloring matter of the present invention may be isolated by acid precipitation or salting-out. In the acid precipitation, for example, the pH is adjusted to 1 to 3 with a mineral acid such as hydrochloric acid or sulfuric acid, whereby the intended coloring matter may be precipitated. The temperature in the acid precipitation is not particularly limited, but is typically 20 to 80° C., and preferably 20 to 60° C. The salting-out is preferably carried out in the range of, for example, acidic to alkaline, and preferably in the pH range of 1 to 11. Although the temperature upon salting-out is not particularly limited, it is preferred to carry out the salting-out by heating to typically 20 to 80° C., and preferably 40 to 70° C., followed by adding sodium chloride or the like. In addition, since the coloring matter of the present invention is water soluble, addition of a water soluble poor solvent (meaning a water soluble organic solvent that does not dissolve the intended compound, or hardly dissolves the intended compound as compared with water) also enables the intended coloring matter to be isolated.

The coloring matter of the present invention is suited for producing an aqueous ink composition for use in dyeing natural and synthetic fiber materials or blended fabrics, as well as for use in writing inks and ink jet recording.

The reaction liquid containing the coloring matter represented by the above formula (1) of the present invention, for example, of the final step in the synthesis reaction of the coloring matter can also be directly used for producing the aqueous ink composition of the present invention. However, following isolating the coloring matter from the reaction liquid etc., by drying, for example, by a method such as spray drying, the resulting coloring matter can be processed into an ink composition. The ink composition of the present invention contains the coloring matter represented by the above formula (1) in an amount of typically 0.1 to 20% by mass, more preferably 0.1 to 10% by mass, and still more preferably 0.1 to 5% by mass in the total mass of the ink composition. Also, the ink composition containing 0.05 to 5% by mass of the coloring matter represented by the above formula (1) is preferred in some cases.

The aqueous ink composition of the present invention is prepared by dissolving the coloring matter represented by the above formula (1) in water, and if necessary in an aqueous medium such as a water soluble organic solvent (organic solvent that is miscible with water) or the like, and further adding thereto an ink preparation agent as needed. When this ink composition is used as an ink for ink jet printer, the content of inorganic substances such as metal cation chlorides (for example, sodium chloride) and sulfuric acid salts (for example, sodium sulfate) contained as impurities is preferably as low as possible. In this regard, the total content of, for example, sodium chloride and sodium sulfate accounts for about no greater than 1% by mass in total mass of the coloring matter contained in the ink. For the production of the coloring matter including less inorganic impurities, for example, a desalination treatment may be carried out with a method with a reverse osmotic membrane well known per se. The desalination treatment can be also executed by other method in which a dried matter or wet cake of the coloring matter or a salt thereof of the present invention is stirred in a mixed solvent of an alcohol such as methanol and water to give a suspension, and the solid is separated by filtration followed by drying.

The aqueous ink composition of the present invention is prepared with water as a medium, and may contain a water soluble organic solvent as needed in the range not to deteriorate the effects of the present invention. The water soluble organic solvent may have a function as a dye solubilizer, a drying-preventive agent (wetting agent), a viscosity adjusting agent, a permeation accelerating agent, a surface tension adjusting agent, a defoaming agent and the like, and it is preferred that the water soluble organic solvent is contained in the aqueous ink composition. The other ink preparation agent includes well-known additives such as for example, a preservative and fungicide, a pH adjusting agent, a chelating reagent, a rust-preventive agent, an ultraviolet ray absorbing agent, a viscosity adjusting agent, a dye solubilizer, a discoloration-preventive agent, an emulsification stabilizer, a surface tension adjusting agent, a defoaming agent, a dispersant, and a dispersion stabilizer. The content of the water soluble organic solvent is 0 to 60% by mass, and preferably 10 to 50% by mass of the entire ink, whereas the ink preparation agent may be used in an amount of 0 to 20% by mass, and preferably 0 to 15% by mass of the entire ink. The remaining component is water.

The water soluble organic solvent usable in the present invention may be, for example: a (C1-C4)alkanol such as methanol, ethanol, n-propanol, isopropanol, n-butanol, isobutanol, secondary butanol or tertiary butanol; an amide such as N,N-dimethylformamide or N,N-dimethylacetamide; a heterocyclic ketone such as 2-pyrrolidone, N-methyl-2-pyrrolidone, hydroxyethyl-2-pyrrolidone, 1,3-dimethylimidazolidin-2-one or 1,3-dimethylhexahydropyrimid-2-one; a ketone or a keto alcohol such as acetone, methylethylketone or 2-methyl-2-hydroxypentan-4-one; a cyclic ether such as tetrahydrofuran or dioxane; a mono-, oligo-, or poly-alkylene glycol or thioglycol having a (C2-C6)alkylene unit such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, polyethylene glycol, polypropylene glycol or thiodiglycol; a polyol (triol) such as trimethylolpropane, glycerin or hexane-1,2,6-triol; a (C1-C4)monoalkyl ether of a polyhydric alcohol such as ethylene glycol monomethyl ether, ethylene glycol monoethyl ether, diethylene glycol monomethyl ether, diethylene glycol monoethyl ether, diethylene glycol monobutyl ether (butylcarbitol), triethylene glycol monomethyl ether or triethylene glycol monoethyl ether; γ-butyrolactone, dimethyl sulfoxide, or the like.

It should be noted that the water soluble organic solvent described above may also include a substance that is solid at ambient temperatures such as trimethylolpropane; however, even if such substances are solid, they exhibit water solubility and thus can be used for the same purpose as water soluble organic solvents when dissolved in water. Therefore, for the sake of simplicity, these solvents are herein referred to be included in the category of the water soluble organic solvent.

As the water soluble organic solvent, preferable examples include isopropanol, glycerin, mono-, di-, or tri-ethylene glycol, dipropylene glycol, 2-pyrrolidone, N-methyl-2-pyrrolidone and butylcarbitol, and more preferable examples include isopropanol, glycerin, diethylene glycol, 2-pyrrolidone, N-methyl-2-pyrrolidone and butylcarbitol. These water soluble organic solvents are used either alone or as a mixture.

The preservative and fungicide may include, for example, organic sulfur based, organic nitrogen sulfur based, organic halogen based, haloallyl sulfone based, iodopropargyl based, N-haloalkylthio based, benzothiazole based, nitrile based, pyridine based, 8-oxyquinoline based, isothiazoline based, dithiol based, pyridineoxide based, nitropropane based, organic tin based, phenol based, quaternary ammonium salt based, triazine based, thiadiazine based, anilide based, adamantane based, dithiocarbamate based, brominated indanone based, benzylbromoacetate based compounds, and the like.

The organic halogen based compound may include, for example, sodium pentachlorophenol; the pyridineoxide based compound may include, for example, sodium 2-pyridinethiol-1-oxide; and the isothiazoline based compound may include, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, 2-methyl-4-isothiazolin-3-one calcium chloride, and the like.

The other preservative and fungicide may be exemplified by sodium acetate, sodium sorbate, sodium benzoate, and the like. Other specific examples of preferable preservative and fungicide include e.g., trade names Proxel GXL (S), Proxel XL-2 (S) manufactured by Avecia Limited, and the like.

The pH adjusting agent may be used for the purpose of improving storage stability of the ink, and an arbitrary substance can be used as long as the pH of the ink can be controlled to fall within the range of 6.0 to 11.0. Examples of the pH adjusting agent include alkanolamines such as diethanolamine and triethanolamine, hydroxides of an alkali metal such as lithium hydroxide, sodium hydroxide and potassium hydroxide, ammonium hydroxide as well as carbonates of an alkali metal such as lithium carbonate, sodium carbonate and potassium carbonate, and the like.

The chelating agent may include, for example, sodium ethylenediamine tetraacetate, sodium nitrilo triacetate, sodium hydroxyethylethylenediamine triacetate, sodium diethylenetriamine pentaacetate, sodium uracil diacetate, and the like.

The rust-preventive agent may include, for example, acidic sulfite, sodium thiosulfate, ammonium thioglycolate, diisopropyl ammonium nitrite, pentaerythritol tetranitrate, dicyclohexyl ammonium nitrite, and the like.

Examples of the ultraviolet ray absorbing agent include benzophenone based compounds, benzotriazole based compounds, cinnamic acid based compounds, triazine based compounds, stilbene based compounds, and the like.

The viscosity adjusting agent may include a water soluble polymer compound as well as a water soluble organic solvent, and specific examples thereof include polyvinyl alcohols, cellulose derivatives, polyamine, polyimine, and the like.

The dye solubilizer may include, for example, urea, ε-caprolactam, ethylene carbonate, and the like. Of these, it is preferred to use urea.

The discoloration-preventive agent is used for the purpose of improving storability of the image. As the discoloration-preventive agent, a variety of organic and metal complex based discoloration-preventive agents may be used. Examples of the organic discoloration-preventive agent include hydroquinones, alkoxyphenols, dialkoxyphenols, phenols, anilines, amines, indanes, chromanes, alkoxyanilines, heterocycles and the like, whereas examples of the metal complex include nickel complexes, zinc complexes and the like.

As the surface tension adjusting agent, surfactants may be exemplified, and examples include anionic surfactants, amphoteric surfactants, cationic surfactants, nonionic surfactants, and the like.

Examples of the anionic surfactant include alkylsulfocarboxylic acid salts, α-olefinsulfonic acid salts, polyoxyethylenealkyl ether acetic acid salts, N-acylamino acid and salts thereof, N-acylmethyltaurine salts, alkylsulfate polyoxyalkyl ether sulfuric acid salts, alkylsulfate polyoxyethylenealkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, dioctyl sulfosuccinic acid salts, and the like.

Examples of the cationic surfactant include 2-vinylpyridine derivatives, poly(4-vinylpyridine) derivatives, and the like.

Examples of the amphoteric surfactant include lauryldimethylamino acetate betaine, 2-alkyl-N-carboxymethyl-N-hydroxyethylimidazolinium betaine, coconut oil fatty acid amide propyldimethylamino acetate betaine, polyoctylpolyaminoethylglycine, as well as imidazoline derivatives, and the like.

Examples of the nonionic surfactant include: ether based surfactants such as polyoxyethylene nonylphenyl ether, polyoxyethylene octylphenyl ether, polyoxyethylene dodecyl phenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene alcohol based surfactants such as 2,4,7,9-tetramethyl-5-decyne-4,7-diol, 3,6-dimethyl-4-octyne-3,6-diol and 3,5-dimethyl-1-hexyn-3-ol (for example, trade names Surfynol 104, 82 and 465, Olfin STG, etc., manufactured by Nissin Chemical Co., Ltd.); and polyglycol ether based surfactants (for example, Tergitol 15-S-7, etc. manufactured by SIGMA-ALDRICH Co.), and the like.

As the defoaming agent, a highly oxidized oil based compound, glycerin fatty acid ester based compound, fluorine based compound, silicone based compound or the like may be used as needed.

These aqueous ink preparation agents may be used either alone or as a mixture. The surface tension of the ink of the present invention is usually 25 to 70 mN/m, and more preferably 25 to 60 mN/m. In addition, the viscosity of the ink of the present invention is adjusted to preferably no greater than 30 mPa·s, and more preferably no greater than 20 mPa·s.

In production of the aqueous ink composition of the present invention, the order of dissolving each reagent such as additives is not particularly limited. When the ink is prepared, water employed preferably includes impurities in an amount as low as possible, and thus water such as ion exchanged water or distilled water is preferred. Furthermore, precision filtration may be carried out to remove contamination, as needed, using a membrane filter or the like. In particular, when the ink is used as an ink for ink jet printers, carrying out the precision filtration is preferred. The filter for carrying out precision filtration has a pore size of usually 1 to 0.1 μm, and preferably 0.8 to 0.1 μm.

The aqueous ink composition containing the coloring matter of the present invention is suited for use in stamp printing, copying, marking, writing, drawing, stamping, or recording (printing), and particularly in ink jet recording. Additionally, the aqueous ink composition of the present invention has superior storage stability, and is accompanied by less quality variation such as deterioration of the absorbance even after being left to stand for a long period of time.

EXAMPLES

Hereinafter, the present invention is more specifically described by way of Examples. In the specification, the expressions "part" and "%" are on the basis of mass unless otherwise specifically stated. In addition, operations such as the synthesis reaction and crystallization step were carried out under stirring unless otherwise specifically stated, and the reaction temperature recorded was measurements in the reaction system.

Example 1

(Step 1)

Into 150 parts of ice water were added 18.5 parts of cyanuric chloride and 0.02 parts of Leocol TD-90 (trade name, surfactant, manufactured by Lion Corporation), and the mixture was stirred at no higher than 10° C. for 30 min. Next, 17.5 parts of 4-aminobenzenesulfonic acid was added thereto, and the mixture was stirred at no higher than 10° C. for 1 hour while adjusting the pH to 3 to 4 with a 13% aqueous sodium hydroxide solution. Then, 17.4 parts of 3-aminobenzenesulfonic acid was added thereto, and the mixture was stirred at 20 to 25° C. for 3 hrs while adjusting the pH to 6 to 9 with a 13% aqueous sodium hydroxide solution. After 100 parts of ice was added to the resulting reaction liquid to lower the liquid temperature to 0 to 5° C., 60 parts of ethylene diamine was added at once. The mixture was stirred at 20 to 25° C. for 12 hrs, and thereafter the pH was adjusted to 1 with 35% hydrochloric acid. Following stirring for 30 min, 60 parts of sodium chloride was added to allow for salting-out. The precipitated solid was separated by filtration to obtain 156 parts of a wet cake. Thus obtained wet cake was added to 450 parts of water, and the pH was adjusted to 11.5 with a 13% aqueous sodium hydroxide solution to dissolve the wet cake. After the pH of the solution was adjusted to 1.0 with 35% hydrochloric acid, salting-out was carried out with sodium chloride. The precipitated solid was separated by filtration to obtain 180 parts of a wet cake. Thus obtained wet cake was added to a mixed solvent of 400 parts of methanol and 40 parts of water, and the mixture was stirred at 50° C. for 1 hour, followed by separation of the precipitated solid by filtration to obtain 104 parts of a wet cake. The obtained wet cake was dried to give 75.3 parts of a compound represented by the following formula (8). The compound represented by the formula (8) is the compound represented by the above formula (7) in which: A is ethylene; $R^1$ and $R^2$ are a hydrogen atom; X is 4-sulfophenylamino; and Y is 3-sulfophenylamino.

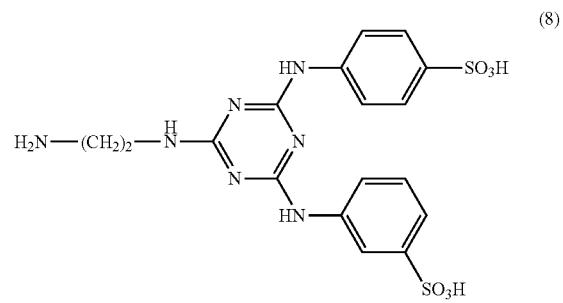

(Step 2)

Into 31.2 parts of chlorosulfonic acid was gradually added 3.6 parts of a compound represented by the following formula (9) at no higher than 50° C., and the mixture was allowed to react at 60° C. for 1 hour, then at 70° C. for 1 hour, and further at 80° C. for additional 7 hrs. Next, the reaction liquid was cooled to 70° C., to which 11.9 parts of thionyl chloride was added dropwise over 10 min, and the reaction was allowed at 80° C. for 3 hrs. The reaction liquid was cooled to no higher than 30° C., and was slowly poured to 150 parts of ice water. Thus precipitated crystals were separated by filtration, and washed with 100 parts of cold water to obtain 30.2 parts of a wet cake of a compound represented by the following formula (10). The compound represented by the formula (10) is the compound represented by the above formula (101), in which Nc is naphthalocyanine not further having a substituent, and M is represented by VO.

(9)

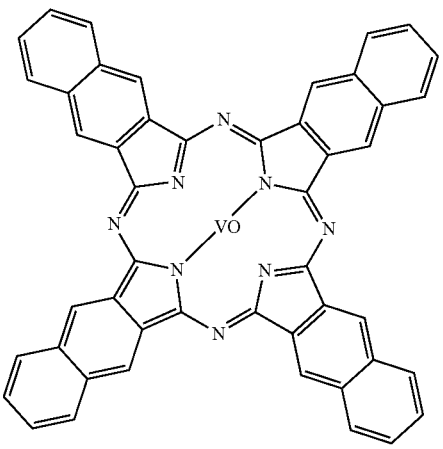

(10)

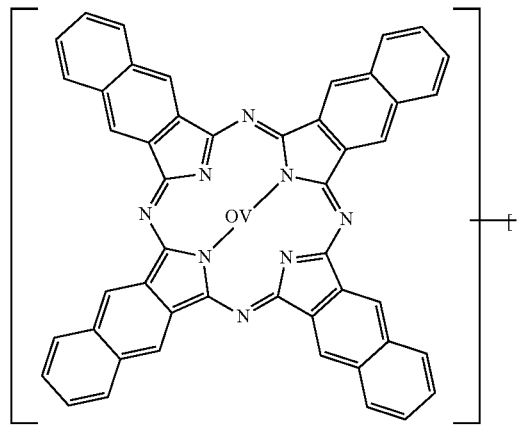

(Step 3)

Into 125 parts of ice water was added 30.2 parts of the wet cake of the compound represented by the formula (10) obtained in the above Step 2, and the mixture was stirred to suspend at no higher than 10° C. Twenty minutes later, 4.85 parts of the compound represented by the formula (8) obtained in the above Step 1 dissolved in a mixed liquid of 70 parts of warm water and 2 parts of 28% aqueous ammonia was added thereto. Following the addition, the pH was adjusted to 9.0 with 28% aqueous ammonia. The reaction was allowed at 18 to 22° C. for 7 hrs, with the pH kept at 9.0 to 9.3. Thereafter, the temperature was elevated to 40° C. while maintaining the same pH, and the reaction was allowed at 37 to 41° C. for 10 hrs, followed by an additional reaction allowed at a further elevated temperature of 55 to 60° C. for 1 hour. Following completion of the reaction, 35% hydrochloric acid was added thereto to adjust the pH to 1.1, and the precipitated solid was separated by filtration to obtain 45.6 parts of a wet cake. Thus obtained wet cake was dissolved by adding 60 parts of water. Thereto was added 400 parts of 2-propanol, and the precipitated solid was separated by filtration to obtain a wet cake. Thus obtained wet cake was dried to give 6.7 parts of a coloring matter represented by the following formula (11) of the present invention, which is a coloring matter represented by the above formula (1) in which: Nc is naphthalocyanine not further having a substituent; M is VO; A is ethylene; X is 4-sulfophenylamino; and Y is 3-sulfophenylamino. λmax: 752 nm (in water).

(11)

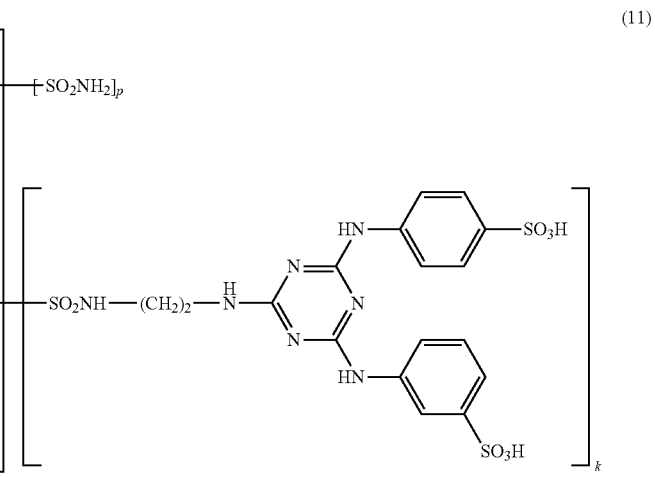

Example 2

Preparation and Storage Stability Test of Aqueous Ink Composition

The aqueous ink composition of the present invention was prepared by dissolving 0.1 parts of the coloring matter of the present invention obtained in the above Example 1 in 100 ml of water. Water employed was ion exchanged water.

Thus prepared aqueous ink composition was left to stand in an oven at 50° C. for 50 days to perform a storage stability test. Prior to and following conducting the test, the aqueous ink composition was subjected to a measurement with a spectrophotometer (UV-3150, manufactured by Shimadzu Corporation) to evaluate storage stability based on alteration in the absorbance at wavelength of maximum absorption. The results are shown in Table 6 below.

Comparative Example 1

For comparison, an aqueous ink composition was prepared and evaluated in a similar manner to Example 2 except that a naphthalocyanine coloring matter represented by the following formula (12) was used in place of the aforementioned compound. This example is referred to as Comparative Example 1. The results are shown in Table 6 below.

The coloring matter represented by the following formula (12) was synthesized as in the following.

Synthesis Example 1

Synthesis of Coloring Matter Represented by the Following Formula (12)

Into 10 parts of fuming sulfuric acid was added 1 part of vanadyloxynaphthalocyanine obtained as a commercially available product, and the reaction was allowed at room temperature for 10 hrs, and at 50° C. for 2 hrs, followed by cooling to room temperature. The reaction liquid was poured into ice water, and sodium chloride was added thereto. Thus precipitated solid was separated by filtration, washed with a 90% aqueous methanol solution, followed by drying to give 0.4 parts of a sodium salt of a coloring matter represented by the following formula (12) used in Comparative Example 1. λmax: 754 nm (in water).

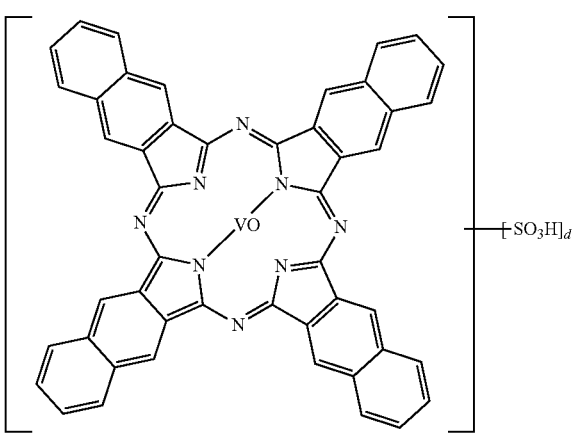

(12)

Comparative Example 2

For comparison, an aqueous ink composition was prepared and evaluated in a similar manner to Example 2 except that a naphthalocyanine coloring matter represented by the following formula (13) was used in place of the coloring matter of the present invention obtained in Example 1. This example is referred to as Comparative Example 2. The results are shown in Table 6 below.

The compound represented by the following formula (13) was synthesized as in the following.

Synthesis Example 2

Synthesis of Coloring Matter Represented by the Following Formula (13)

Into 20 parts of fuming sulfuric acid was added 2 parts of copper naphthalocyanine, and the reaction was allowed at 60° C. for 9 hrs reaction, followed by cooling to room temperature. The reaction liquid was poured into ice water, and the precipitated solid yielded by concentrating thus obtained liquid was separated by filtration. Thus obtained solid was washed with a 90% aqueous methanol solution, and dried to give 0.8 parts of a coloring matter represented by the following formula (13).

This compound was subjected to determination of the amount of introduced sulfonic acid group with mass spectrometry using LC-MS (LC: HP-1100, manufactured by Agilent Technologies, Inc./MS: LCT manufactured by Micromass Limited). λmax: 715 nm (in water).

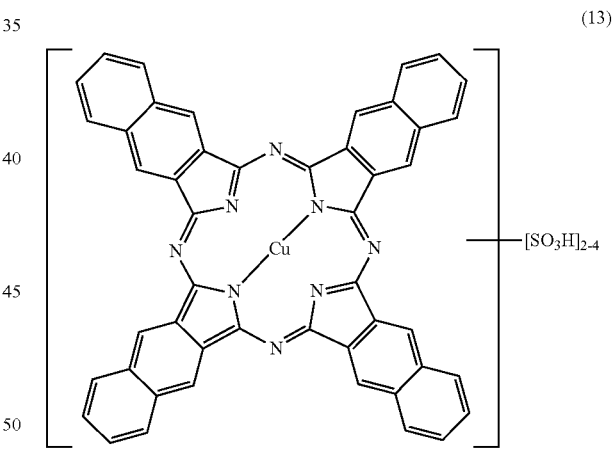

(13)

TABLE 6

| | Storage Stability Test | |
|---|---|---|
| | Residual ratio of coloring matter in ink composition (%) | |
| | Before test | After test |
| Example 2 | 100 | 98 |
| Comparative Example 1 | 100 | 9 |
| Comparative Example 2 | 100 | 33 |

As is clear from the results shown in Table 6, the ink composition of each Comparative Example exhibited the residual ratio of the coloring matter following the test was as low as 9% or 33%. To the contrary, the ink composition of the present invention exhibited the residual ratio of as high as 98%, revealing that an ink composition that is superior in storage stability was provided.

Example 3

(Step 1)

Into 300 parts of ice water were added 96.5 parts of cyanuric chloride and 0.02 parts of trade name LIPAL OH, and the mixture was stirred at no higher than 10° C. for 30 min. To this liquid was added 150.8 parts of 2,5-disulfoaniline monosodium salt (purity: 91.2%), and the reaction was allowed at 10 to 15° C. for 2 hrs, and at 25 to 30° C. for 2 hrs, with the pH kept at 2.7 to 3.0 by adding a 25% aqueous sodium hydroxide solution. After cooling thus resulting reaction liquid to no higher than 10° C., a 25% aqueous sodium hydroxide solution was added to adjust the pH to 10.0. To this reaction liquid was added 60.7 parts of 28% aqueous ammonia, and the reaction was allowed at 10 to 15° C. for 2 hrs, and at 27 to 30° C. for 2 hrs To thus resulting reaction liquid was added 600 parts of ethylene diamine, and the reaction was allowed at 80° C. for additional 1 hour. The amount of the resulting reaction liquid was adjusted to 2,000 parts, and thereto was added 200 parts of sodium chloride. The pH of the mixture was adjusted to 1.0 with conc. hydrochloric acid, whereby the solid was precipitated. Thus precipitated solid was separated by filtration, washed with 500 parts of a 20% aqueous sodium chloride solution to obtain 245.9 parts of a wet cake. To 1,700 parts of methanol were added 245.9 parts of the obtained wet cake and 90 parts of water, and the mixture was stirred at 60° C. for 1 hour, followed by separation of the precipitated solid by filtration. After thus obtained solid was washed with methanol, drying gave 125.8 parts of a compound represented by the following formula (14). The compound represented by the formula (14) is the compound represented by the above formula (7) in which: A is ethylene; $R^1$ and $R^2$ are a hydrogen atom; X is 2,5-disulfophenylamino; and Y is amino.

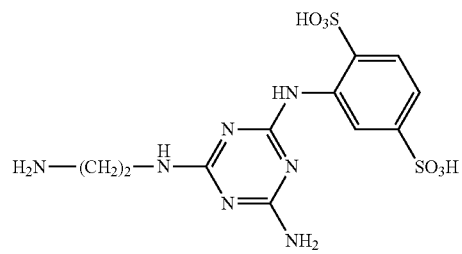

(14)

(Step 2)

After 9.3 parts of the wet cake of the compound represented by the formula (10) obtained in a similar manner to Step 2 of Example 1 was washed with acetone, drying under reduced pressure gave 7.5 parts of a dry solid of the compound represented by the formula (10).

Into 90 parts of ice water was added 4.5 parts of the dry solid of the compound represented by the above formula (10), and the mixture was stirred at no higher than 5° C. for 20 min. To this liquid was added 5.75 parts of the compound represented by the above formula (14) dissolved in a mixed liquid of 50 parts of warm water and 2 parts of 28% aqueous ammonia. The pH of this liquid was adjusted to 9.0 with 28% aqueous ammonia, and the reaction was allowed, with the pH kept at 9.0 to 9.3, at 18 to 22° C. for 12 hrs, and then at 53 to 57° C. for 3 hrs. To the resulting reaction liquid was added 35% hydrochloric acid to adjust the pH to 1.1, and the precipitated solid was separated by filtration to obtain a wet cake. Thus obtained wet cake was added to 75 parts of warm water, and dissolved by adjusting the pH to 12 to 12.5 with a 25% aqueous sodium hydroxide solution. The insoluble matter was removed by filtration to give about 100 parts of a filtrate. The pH of thus obtained filtrate was adjusted to 1.1 by adding 35% hydrochloric acid, and the precipitated solid was separated by filtration to obtain 15 parts of a wet cake. Thus obtained wet cake was added to 50 parts of warm water, and the pH was adjusted to 12 to 12.5 with a 25% aqueous sodium hydroxide solution to give a solution. To this solution was added 300 parts of 2-propanol, and the mixture was stirred at 18 to 22° C. for 12 hrs. The precipitated solid was separated by filtration to obtain a wet cake. Thus obtained wet cake was dried to give 2.3 parts of a coloring matter represented by the following formula (15) of the present invention, which is the coloring matter represented by the above formula (1) in which: Nc is naphthalocyanine not further having a substituent; M is VO; A is ethylene; X is 2,5-disulfophenylamino; and Y is amino. λmax: 750 nm (in water).

(15)

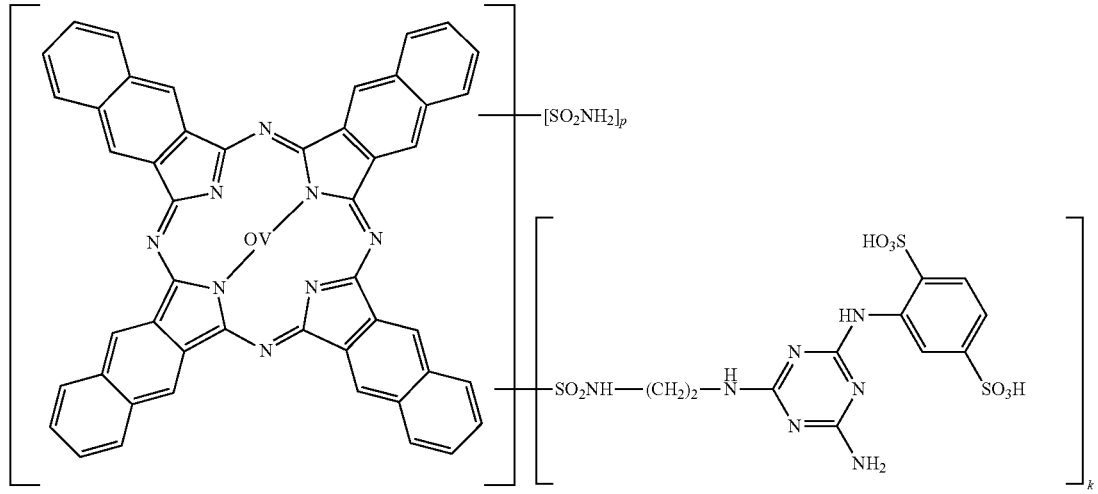

Example 4

(Step 1)

Into 330 parts of ice water were added 18.4 parts of cyanuric chloride and 0.2 parts of Leocol TD-90 (trade name, surfactant, manufactured by Lion Corporation), and the mixture was stirred at no higher than 10° C. for 30 min. To this liquid was added 17.4 parts of 4-sulfoaniline (commercially available product having a purity of 99.3%), and the reaction was allowed while adjusting the pH to 2.6 to 3.0 with a 10% aqueous sodium hydroxide solution at 0 to 5° C. for 1 hour, and further adjusting the pH to 3.0 to 3.5 at 0 to 5° C. for 1 hour, followed by at 25 to 30° C. for 1 hour. To thus resulting reaction liquid was added 12.6 parts of 2-sulfoethylamine, and the reaction was allowed while adjusting the pH to 7.0 to 8.0 with a 10% aqueous sodium hydroxide solution at 25° C. for 2 hrs. To the resulting reaction liquid was added 250 parts of ice to cool the mixture to 0° C., and then 60 parts of ethylene diamine was added dropwise while the liquid temperature was kept at no higher than 5° C. Following stirring this reaction liquid at room temperature overnight, the pH of the reaction liquid was adjusted to 1.0 with conc. hydrochloric acid. During this step, the liquid temperature was kept at 10 to 15° C. by adding ice to suppress heat generation. The amount of the resulting reaction liquid was 980 parts. To this reaction liquid was added 190 parts of sodium chloride, and the mixture was stirred for 30 min. The precipitated solid was separated by filtration to obtain 70.6 parts. Thus obtained wet cake was added to 280 parts of water, and the pH was adjusted to 9.0 with a 10% aqueous sodium hydroxide solution to give a solution. The amount of the liquid was 400 parts in this step. The pH of this solution was adjusted to 1.0 with conc. hydrochloric acid, and 80 parts of sodium chloride was added thereto, followed by stirring for 30 min. Thus precipitated solid was separated by filtration to obtain 110.1 parts of a wet cake. Thus obtained wet cake was added to a mixed solvent of 260 parts of methanol and 26 parts of water, and the mixture was stirred at 50° C. for 1 hour, followed by separation of the precipitated solid by filtration to obtain 89.1 parts of a wet cake. The obtained wet cake was dried to give 49.3 parts of a compound represented by the following formula (16). The compound represented by the formula (16) is the compound represented by the above formula (7) in which: A is ethylene; $R^1$ and $R^2$ are a hydrogen atom; X is 4-sulfophenylamino; and Y is sulfoethylamino.

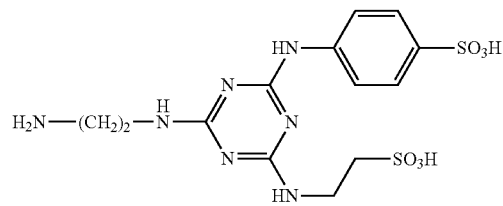

(16)

(Step 2)

Into 125 parts of ice water was added 4.3 parts of the dry solid of the compound represented by the above formula (10) obtained in a similar manner to Step 2 of Example 3, and the mixture was stirred at no higher than 5° C. for 20 min. To this liquid was added a solution of 7.5 parts of the compound represented by the above formula (16) dissolved in a mixed solution of 50 parts of warm water and 2 parts of 28% aqueous ammonia. The pH of this liquid was adjusted to 9.0 with 28% aqueous ammonia, and the reaction was allowed, at a pH of 9.0 to 9.3, at 18 to 22° C. for 12 hrs, and then at 53 to 57° C. for 3 hrs. To the resulting reaction liquid was added 35% hydrochloric acid to adjust the pH to 1.1, and the precipitated solid was separated by filtration to obtain a wet cake. Thus obtained wet cake was added to 75 parts of warm water, and dissolved by adjusting the pH to 12 to 12.5 with a 25% aqueous sodium hydroxide solution. The insoluble matter was removed by filtration to give about 100 parts of a filtrate. The pH of thus obtained filtrate was adjusted to 1.1 by adding 35% hydrochloric acid, and the precipitated solid was separated by filtration to obtain 15 parts of a wet cake. Thus obtained wet cake was added to 50 parts of warm water, and the pH was adjusted to 12 to 12.5 with a 25% aqueous sodium hydroxide solution to give a solution. To this solution was added 300 parts of 2-propanol, and the mixture was stirred at 18 to 22° C. for 12 hrs. The precipitated solid was separated by filtration to obtain a wet cake. Thus obtained wet cake was dried to give 4.29 parts of a coloring matter represented by the following formula (17) of the present invention, which is the coloring matter represented by the above formula (1) in which: Nc is naphthalocyanine not further having a substituent; M is VO; A is ethylene; X is 4-sulfophenylamino; and Y is sulfoethylamino. λmax: 751 nm (in water).

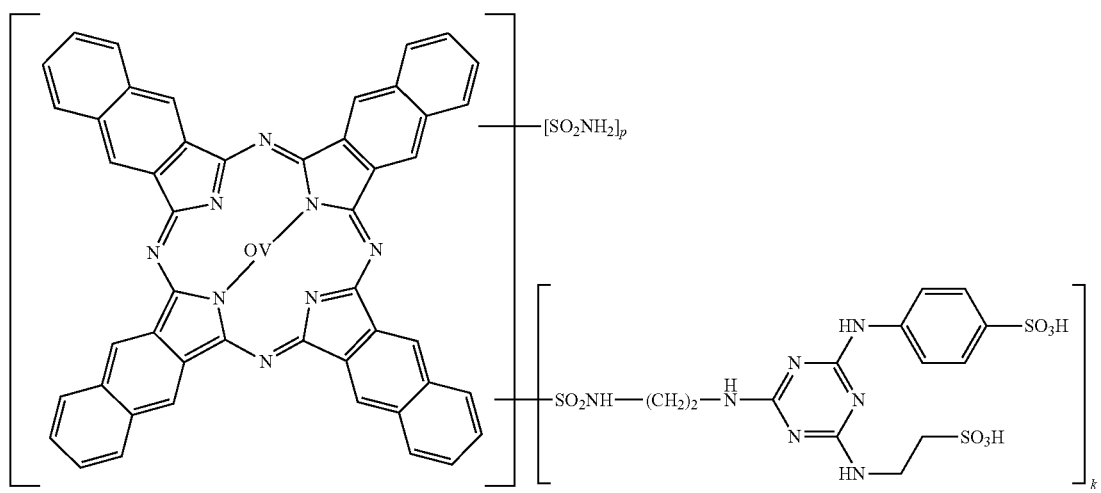

(17)

Example 5

(Step 1)

Into 150 parts of ice water were added 18.4 parts of cyanuric chloride and 0.2 parts of Leocol TD-90 (trade name, surfactant, manufactured by Lion Corporation), and the mixture was stirred for 30 min. To this liquid was added 32.8 parts of 2,5-disulfoaniline, and the reaction was allowed while adjusting the pH to 2.6 to 3.0 with a 10% aqueous sodium hydroxide solution at 0 to 5° C. for 1 hour, and at 25 to 30° C. for 1 hour. Thus resulting reaction liquid was allowed to react at 50° C. for additional 3 hours, with the pH kept at 9.0 to 9.5 with a 10% aqueous sodium hydroxide solution. To the reaction liquid was added 250 parts of ice to cool to 0° C., and 60 parts of ethylene diamine was added dropwise while the liquid temperature was kept at no higher than 5° C. After allowing for the reaction at room temperature overnight, the pH of the reaction liquid was adjusted to 1.0 with conc. hydrochloric acid. During this step, the liquid temperature was kept at 10 to 15° C. by adding ice to suppress heat generation. The amount of thus resulting reaction liquid was 830 parts. To this reaction liquid was added 166 parts of sodium chloride, and the mixture was stirred for 30 min. The precipitated solid was separated by filtration to obtain 59.3 parts of a wet cake. Thus obtained wet cake was added to 280 parts of water, and the pH was adjusted to 9.0 with a 10% aqueous sodium hydroxide solution to give a solution. The amount of thus obtained solution was 400 parts. The pH of this solution was adjusted to 1.0 by adding conc. hydrochloric acid, and 80 parts of sodium chloride was added thereto, followed by stirring for 30 min. Thus precipitated solid was separated by filtration to obtain 53.5 parts of a wet cake. Thus obtained wet cake was added to a mixed solution of 420 parts of methanol and 80 parts of water, and the mixture was stirred at 50° C. for 1 hour, followed by separation of the precipitated solid by filtration to obtain 55.9 parts of a wet cake. The obtained wet cake was dried to give 18.9 parts of a compound represented by the following formula (18). The compound represented by the formula (18) is the compound represented by the above formula (7) in which: A is ethylene; $R^1$ and $R^2$ are a hydrogen atom; X is 2,5-disulfophenylamino; and Y is hydroxy.

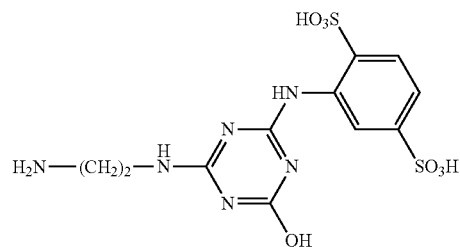

(18)

(Step 2)

Into 125 parts of ice water was added 9.5 parts of the wet cake of the compound represented by the formula (10) obtained in a similar manner to Step 2 of Example 1, and the mixture was stirred at no higher than 5° C. for 20 min. To this liquid was added 2.2 parts of the compound represented by the above formula (18) dissolved in a mixed solution of 50 parts of warm water and 2 parts of 28% aqueous ammonia. The pH of the resulting liquid was adjusted to 9.0 with 28% aqueous ammonia, and the reaction was allowed, with the pH kept at 9.0 to 9.3, at 18 to 22° C. for 12 hrs, and then at 53 to 57° C. for 3 hrs. To the resulting reaction liquid was added 35% hydrochloric acid to adjust the pH to 1.1, and the precipitated solid was separated by filtration to obtain a wet cake. Thus obtained wet cake was added to 75 parts of warm water, and dissolved by adjusting the pH to 12 to 12.5 with a 25% aqueous sodium hydroxide solution. Thereafter, the insoluble matter was removed by filtration to give about 100 parts of a filtrate. The pH of thus obtained filtrate was adjusted to 1.1 by adding 35% hydrochloric acid, and the precipitated solid was separated by filtration to obtain 15 parts of a wet cake. Thus obtained wet cake was added to 50 parts of warm water, and the pH was adjusted to 12 to 12.5 with a 25% aqueous sodium hydroxide solution to give a solution. To this solution was added 300 parts of 2-propanol, and the mixture was stirred at 18 to 22° C. for 12 hrs. The precipitated solid was separated by filtration to obtain a wet cake. Thus obtained wet cake was dried to give 1.3 parts of a coloring matter represented by the following formula (19) of the present invention, which is the coloring matter represented by the above formula (1) in which: Nc is naphthalocyanine not further having a substituent; M is VO; A is ethylene; X is 2,5-disulfophenylamino; and Y is hydroxy. λmax: 755 nm (in water).

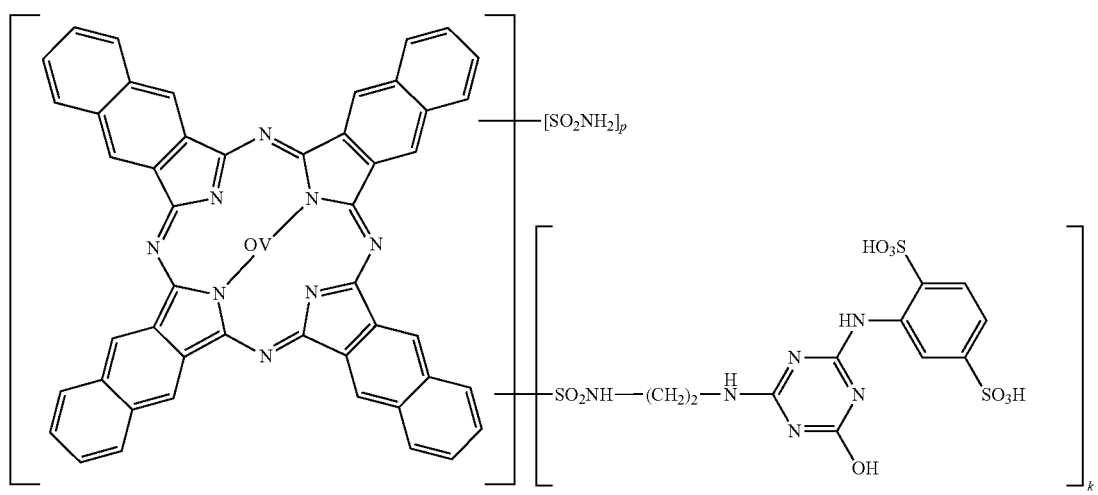

(19)

Example 6

(Step 1)

Into 150 parts of ice water were added 18.5 parts of cyanuric chloride and 0.02 parts of Leocol TD-90 (trade name, surfactant, manufactured by Lion Corporation), and the mixture was stirred at no higher than 10° C. for 30 min. To this liquid was added 17.5 parts of 4-aminobenzenesulfonic acid, and the reaction was allowed while adjusting the pH to 3 to 4 with a 13% aqueous sodium hydroxide solution at no higher than 10° C. for 1 hour. To thus resulting reaction liquid was added 17.4 parts of 5-aminoisophthalic acid, and the mixture was stirred while adjusting the pH to 6 to 9 with a 13% aqueous sodium hydroxide solution at 20 to 25° C. for 3 hrs. After 100 parts of ice was added to the resulting reaction liquid to lower the liquid temperature to 0 to 5° C., 60 parts of ethylene diamine was added at once, and the reaction was allowed at 20 to 25° C. for 12 hrs. The pH of the resulting reaction liquid was adjusted to 1 with 35% hydrochloric acid, and the mixture was stirred for 30 min. Thereto was added 60 parts of sodium chloride, and the precipitated solid was separated by filtration to obtain 156 parts of a wet cake. Thus obtained wet cake was added to 450 parts of water, and the pH was adjusted to 11.5 with a 13% aqueous sodium hydroxide solution to give a solution. Following adjusting the pH of the resulting solution to 1.0 with 35% hydrochloric acid, 80 parts of sodium chloride was added thereto. The precipitated solid was separated by filtration to obtain 180 parts of a wet cake. Thus obtained wet cake was added to a mixed solution of 400 parts of methanol and 40 parts of water, and the mixture was stirred at 50° C. for 1 hour. The precipitated solid was separated by filtration to obtain 104 parts of a wet cake. The obtained wet cake was dried to give 75.3 parts of a compound represented by the following formula (20). The compound represented by the formula (20) is the compound represented by the above formula (7) in which: A is ethylene; $R^1$ and $R^2$ are a hydrogen atom; X is 4-sulfophenylamino; and Y is 3,5-dicarboxyphenylamino.

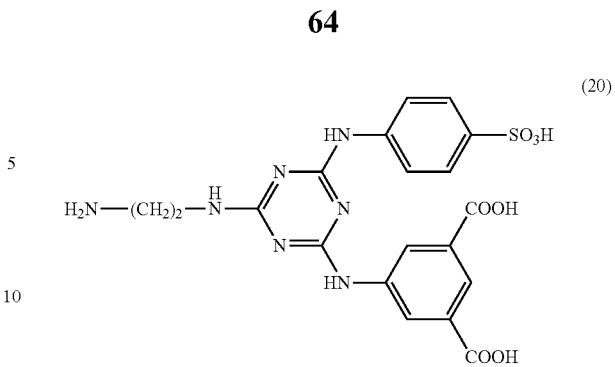

(20)

(Step 2)

Into 125 parts of ice water was added 9.5 parts of the wet cake of the compound represented by the above formula (10) obtained in a similar manner to Step 2 of Example 1, and the mixture was stirred at no higher than 5° C. for 20 min. To this liquid was added 2.2 parts of the compound represented by the above formula (20) dissolved in a mixed solution of 50 parts of warm water and 2 parts of 28% aqueous ammonia. The pH of this liquid was adjusted to 9.0 with 28% aqueous ammonia, and the reaction was allowed, with the pH kept at 9.0 to 9.3, at 18 to 22° C. for 12 hrs, and then at 53 to 57° C. for 3 hrs. To the resulting reaction liquid was added 35% hydrochloric acid to adjust the pH to 1.1, and the precipitated solid was separated by filtration to obtain 4.5 parts of a wet cake. Thus obtained wet cake was added to 75 parts of warm water, and dissolved by adjusting the pH to 12 to 12.5 with a 25% aqueous sodium hydroxide solution. The insoluble matter was removed by filtration to give about 100 parts of a filtrate. The pH of thus obtained filtrate was adjusted to 1.1 by adding 35% hydrochloric acid, and the precipitated solid was separated by filtration to obtain 15 parts of a wet cake. Thus obtained wet cake was added to 50 parts of warm water, and the pH was adjusted to 12 to 12.5 with a 25% aqueous sodium hydroxide solution to give a solution. To this solution was added 300 parts of 2-propanol, and the mixture was stirred at 18 to 22° C. for 12 hrs. The precipitated solid was separated by filtration to obtain a wet cake. The entirety of thus obtained wet cake was dried to give 3.33 parts of a coloring matter represented by the following formula (21) of the present invention, which is the coloring matter represented by the above formula (1) in which: Nc is naphthalocyanine not further having a substituent; M is VO; A is ethylene; X is 4-sulfophenylamino; and Y is 3,5-dicarboxyphenylamino. λmax: 752 nm (in water).

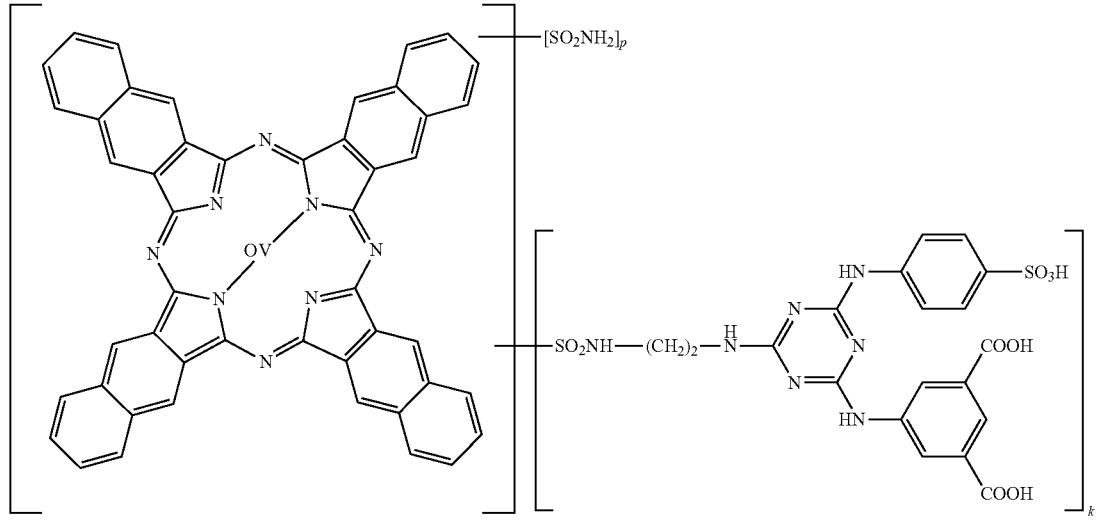

(21)

Example 7

(Step 1)

Into 150 parts of ice water were added 18.4 parts of cyanuric chloride and 0.2 parts of Leocol TD-90 (trade name, surfactant, manufactured by Lion Corporation), and the mixture was stirred at no higher than 10° C. for 30 min. To this liquid was added 28.0 parts of 3-aminobenzoic acid (purity: 99%), and the reaction was allowed while adjusting the pH to 6.0 to 7.0 with a 10% aqueous sodium hydroxide solution at 0 to 10° C. for 1.5 hrs, then at 20 to 25° C. for 1.5 hrs, and further at 40 to 45° C. for 1.5 hrs. To thus resulting reaction liquid was added 60 parts of ethylene diamine dropwise. After the mixture was stirred at room temperature overnight, the pH of the reaction liquid was adjusted to 5.0 with conc. hydrochloric acid. The amount of thus resulting reaction liquid was 1,000 parts. To this reaction liquid was added 100 parts of sodium chloride, and the mixture was stirred for 30 min. The precipitated solid was separated by filtration to obtain 207.5 parts of a wet cake. Thus obtained wet cake was added to 600 parts of water, and the pH was adjusted to 9.0 with a 10% aqueous sodium hydroxide solution to give a solution in a liquid amount of 850 parts. The pH of this solution was adjusted to 5.0 with conc. hydrochloric acid. The precipitated solid after stirring the solution for 30 min was separated by filtration and washed with 200 parts of water to obtain 221 parts of a wet cake. Thus obtained wet cake was dried to give 40.1 parts of a white powder of a compound represented by the following formula (22). The compound represented by the formula (22) is the compound represented by the above formula (7) in which: A is ethylene; $R^1$ and $R^2$ are a hydrogen atom; and both X and Y are 3-carboxyphenylamino.

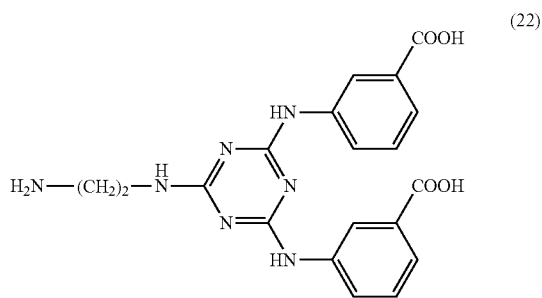

(22)

(Step 2)

Into 40 parts of ice water was added 2.1 parts of the dry solid of the compound represented by the formula (10) obtained in a similar manner to Step 2 of Example 3, and the mixture was stirred at no higher than 5° C. for 20 min. To this liquid was added 2.02 parts of the compound represented by the above formula (22) dissolved in a mixed solution of 30 parts of warm water and 2 parts of 28% aqueous ammonia. The pH of the resulting liquid was adjusted to 9.0 with 28% aqueous ammonia, and the reaction was allowed, with the pH kept at 9.0 to 9.3, at 18 to 22° C. for 12 hrs, and then at 53 to 57° C. for 3 hrs. To the resulting reaction liquid was added 35% hydrochloric acid to adjust the pH to 1.1, and the precipitated solid was separated by filtration to obtain 4.3 parts of a wet cake. Thus obtained wet cake was added to 50 parts of warm water, and dissolved by adjusting the pH to 12 to 12.5 with a 25% aqueous sodium hydroxide solution. The insoluble matter was removed by filtration to give about 150 parts of a filtrate. The pH of thus obtained filtrate was adjusted to 1.1 by adding 35% hydrochloric acid, and the precipitated solid was separated by filtration to obtain about 10 parts of a wet cake. Thus obtained wet cake was added to 30 parts of warm water, and the pH was adjusted to 12 to 12.5 with a 25% aqueous sodium hydroxide solution to give a solution. To this solution was added 300 parts of 2-propanol, and the mixture was stirred at 18 to 22° C. for 12 hrs. The precipitated solid was separated by filtration to obtain a wet cake. The entirety of thus obtained wet cake was dried to give 2.2 parts of a coloring matter represented by the following formula (23) of the present invention, which is the coloring matter represented by the above formula (1) in which: Nc is naphthalocyanine not further having a substituent; M is VO; A is ethylene; and both X and Y are 3-carboxyphenylamino. λmax: 749 nm (in water).

Examples 8 to 11

Preparation and Storage Stability Test of Aqueous Ink Composition

The aqueous ink compositions of the present invention were prepared in a similar manner to Example 2 except that the coloring matters of the present invention obtained in Examples 3 to 6 were used in place of the coloring matter of the present invention obtained in Example 1. Preparations of these ink compositions are referred to as Examples 8 to 11.

Thus prepared each aqueous ink composition was left to stand in an oven at 50° C. for 50 days to perform the storage stability test. Prior to and following conducting the test, the aqueous ink composition was subjected to a measurement with a spectrophotometer (UV-3150, manufactured by Shimadzu Corporation) to evaluate storage stability based on alteration in the absorbance at wavelength of maximum absorption.

With respect to Comparative Examples 1 and 2, those described above were employed. The results are shown in Table 7 below.

TABLE 7

| Results of storage stability test | Residual ratio of coloring matter in ink composition (%) | |
|---|---|---|
| | Before test | After test |
| Example 8 | 100 | 99.1 |
| Example 9 | 100 | 99.0 |
| Example 10 | 100 | 100 |
| Example 11 | 100 | 100 |
| Comparative Example 1 | 100 | 9 |
| Comparative Example 2 | 100 | 33 |

As is clear from the results shown in Table 7, the ink compositions of the present invention exhibited very high residual ratios of the coloring matter, clearly suggesting that those ink compositions are significantly superior in storage stability as compared with each Comparative Example.

INDUSTRIAL APPLICABILITY

The water-soluble and near-infrared absorbing coloring matter or a salt thereof of the present invention is superior in solubility in water or a water soluble organic solvent. In addition, the aqueous ink composition of the present invention containing this compound exhibits extremely favorable storage stability, without being accompanied by crystal precipitation, physical property alteration, change in the hue and the like after storage for a long period of time, and extremely suitably used as a near-infrared absorbing ink for stamp printing, copying, marking, writing, drawing, stamping, or recording (printing), and particularly for ink jet recording.

The invention claimed is:

1. A coloring matter represented by the following formula (1) or a salt thereof,

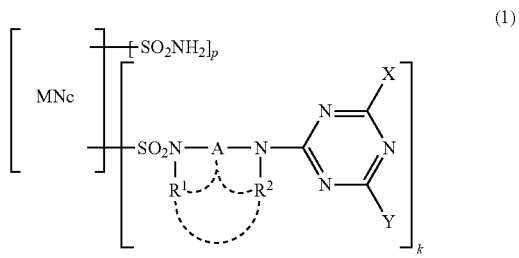

(1)

wherein,

Nc represents naphthalocyanine which may have a substituent;

M represents a metal atom, a metal oxide, a metal hydroxide or a metal halide that serves as a central metal of naphthalocyanine represented by Nc, or a hydrogen atom;

$R^1$ and $R^2$ each independently represent a hydrogen atom, a substituted or unsubstituted alkyl group, a substituted or unsubstituted aralkyl group, or a substituted or unsubstituted aryl group;

A represents a crosslinking group;

X and Y each independently represent a halogen atom, a hydroxy group, an amino group, a substituted or unsubstituted alkoxy group, a substituted or unsubstituted aryloxy group, a substituted or unsubstituted aralkyloxy group, a substituted or unsubstituted monoalkylamino group, a substituted or unsubstituted dialkylamino group, a substituted or unsubstituted arylamino group, a substituted or unsubstituted aralkylamino group, a substituted or unsubstituted alkylthio group, a substituted or unsubstituted arylthio group, or a substituted or unsubstituted aralkylthio group;

both k and p are a mean value, k is greater than 0 and no greater than 12, p is no less than 0 and less than 12, and the sum of k and p is greater than 0 and no greater than 12; and any two among $R^1$, $R^2$, and A may be joined to form a ring.

2. The coloring matter or a salt thereof according to claim 1, wherein the coloring matter represented by the formula (1) or a salt thereof is a coloring matter represented by the following formula (2) or a salt thereof,

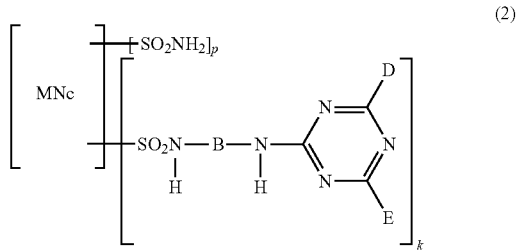

(2)

wherein,

Nc, M, k, and p are as defined in connection with the above formula (1);

B represents an alkylene group, a phenylene group, or a xylylene group; and

D and E each independently represent a chlorine atom; a hydroxy group; an amino group; an alkoxy group unsubstituted, or substituted with a hydroxy group, a sulfo group or a carboxy group; a phenoxy group unsubstituted, or having a benzene ring substituted with one or at least two substituents selected from the group consisting of a chlorine atom, an alkyl group, an alkoxy group, a sulfo group and a carboxy group; a naphthoxy group unsubstituted, or having a naphthalene ring substituted with one or two substituents selected from the group consisting of an acetylamino group and a sulfo group; a benzyloxy group unsubstituted, or having a benzene ring substituted with a sulfo group; a phenethyloxy group unsubstituted, or having a benzene ring substituted with a sulfo group; a mono- or di-alkylamino group unsubstituted, or substituted with a hydroxy group, an unsubstituted C1-C4 alkoxy group, a sulfo group or a carboxy group; a phenylamino group unsubstituted, or having a benzene ring substituted with one or at least two substituents selected from the group consisting of a chlorine atom, an unsubstituted C1-C4 alkyl group, an unsubstituted C1-C4 alkoxy group, a sulfo group and a carboxy group; a naphthylamino group unsubstituted, or having a naphthalene ring substituted with a sulfo group; a benzylamino group unsubstituted, or having a benzene ring substituted with a sulfo group; a phenethylamino group unsubstituted, or having a benzene ring substituted with a sulfo group; an alkylthio group unsubstituted, or substituted with a hydroxy group, a sulfo group or a carboxy group; a phenylthio group unsubstituted, or having a benzene ring substituted with one or at least two substituents selected from the group consisting of an unsubstituted C1-C4 alkyl group, an unsubstituted C1-C4 alkoxy group, a sulfo group and a carboxy group; or a naphthylthio group unsubstituted, or having a naphthalene ring substituted with a sulfo group.

3. The coloring matter or a salt thereof according to claim 2, wherein: B represents a C2-C6 alkylene group; and D and E each independently represent a chlorine atom; a hydroxy group; an amino group; a mono- or di-C1-C4 alkylamino group unsubstituted or substituted with a hydroxy group, an unsubstituted C1-C4 alkoxy group, a sulfo group or a carboxy group; a phenylamino group unsubstituted, or having a benzene ring substituted with one or at least two substituents selected from the group consisting of an unsubstituted C1-C4 alkyl group, an unsubstituted C1-C4 alkoxy group, a sulfo group and a carboxy group; a naphthylamino group unsubstituted, or having a naphthalene ring substituted with a sulfo group; a benzylamino group unsubstituted, or having a benzene ring substituted with a sulfo group; or a phenethylamino group unsubstituted, or having a benzene ring substituted with a sulfo group.

4. The coloring matter or a salt thereof according to claim 1, wherein M represents a metal atom, a metal oxide, a metal hydroxide, or a metal halide selected from the group consisting of Fe, Co, Cu, Ni, Zn, Al, AlOH, AlCl, V, and VO.

5. The coloring matter or a salt thereof according to claim 2, wherein Nc represents naphthalocyanine not having a substituent other than substituted sulfamoyl groups the number of substitution therewith is represented by k, and unsubstituted sulfamoyl groups the number of substitution therewith is represented by p;

both k and p are a mean value; k is no less than 0.1 and no greater than 4, and the sum of k and p is no less than 0.1 and no greater than 12;

M represents Cu or VO;
B represents an ethylene group or a propylene group; and
D and E each independently represent a hydroxy group, an amino group, a phenylamino group unsubstituted, or substituted with at least one carboxy group or a sulfo group, or a mono C2-C4 alkylamino group unsubstituted, or substituted with at least one carboxy group or a sulfo group.

6. The coloring matter or a salt thereof according to claim 1, which is obtained by allowing a compound represented by the following formula (101), and a compound represented by the following formula (7) to react in the presence of a source of ammonia,

(101)

wherein, Nc and M are as defined in connection with the formula (1), and n is a mean value, which is greater than 0 and no greater than 12,

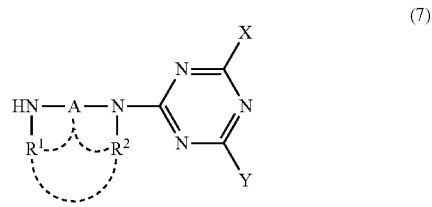

(7)

wherein, $R^1$, $R^2$, A, X, and Y are as defined in connection with the formula (1).

7. An aqueous ink composition comprising at least one coloring matter or a salt thereof according to claim 1.

8. The aqueous ink composition according to claim 7 further comprising an aqueous organic solvent.

9. The aqueous ink composition according to claim 7 for utilization in ink jet recording.

10. An ink jet recording method comprising discharging ink droplets of the aqueous ink composition according to claim 7 in response to recording signals to execute recording by allowing the ink droplets of the ink composition to adhere on a record-receiving material.

11. The ink jet recording method according to claim 10, wherein the record-receiving material is a communication sheet.

12. The ink jet recording method according to claim 11, wherein the communication sheet is a sheet having an ink receiving layer comprising a porous white inorganic substance.

13. An ink jet printer equipped with a vessel comprising the aqueous ink composition according to claim 7.

14. A recorded matter recorded with the aqueous ink composition according to claim 7.

15. The recorded matter according to claim 14, wherein recording is carried out utilizing an ink jet printer.

* * * * *